(12) United States Patent
Abe et al.

(10) Patent No.: US 10,924,050 B2
(45) Date of Patent: Feb. 16, 2021

(54) MOTOR CONTROL CIRCUIT AND MOTOR CONTROLLER

(71) Applicants: Makio Abe, Tokyo (JP); Shu Hayashi, Tokyo (JP); Masato Aoki, Nagano (JP)

(72) Inventors: Makio Abe, Tokyo (JP); Shu Hayashi, Tokyo (JP); Masato Aoki, Nagano (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/576,979

(22) Filed: Sep. 20, 2019

(65) Prior Publication Data

US 2020/0106379 A1 Apr. 2, 2020

(30) Foreign Application Priority Data

Sep. 27, 2018 (JP) .............................. JP2018-182505

(51) Int. Cl.
 *H02P 27/04* (2016.01)
 *H02P 27/08* (2006.01)

(52) U.S. Cl.
 CPC .......... *H02P 27/045* (2013.01); *H02P 27/085* (2013.01)

(58) Field of Classification Search
 CPC ........ H02P 27/045; H02P 27/085; H02P 6/00; H02P 6/08; H02P 2207/05
 USPC ..................................................... 318/503, 494
 See application file for complete search history.

(56) References Cited

U.S. PATENT DOCUMENTS

| 6,034,494 | A | * | 3/2000 | Kitamine | .................. | H02P 6/21 |
|||||||318/400.11|
| 8,405,337 | B2 | * | 3/2013 | Gebhart | .................. | H02P 6/085 |
|||||||318/445|
| 9,698,722 | B2 | * | 7/2017 | Loken | ............... | H02M 7/53875 |
| 2004/0085668 | A1 | | 5/2004 | Sakamoto | | |
| 2018/0183368 | A1 | | 6/2018 | Murakami | | |

FOREIGN PATENT DOCUMENTS

| JP | 2004-152441 | 5/2004 |
| JP | 2018-107914 | 7/2018 |

* cited by examiner

*Primary Examiner* — David Luo
(74) *Attorney, Agent, or Firm* — IPUSA, PLLC

(57) ABSTRACT

A motor control circuit includes a control circuit configured to output a pulse width modulation signal for controlling a switching operation of an inverter circuit, the inverter circuit being configured to supply an alternating current power to a motor, and includes a speed-change detecting circuit configured to detect a change in a speed command signal and, output, in response to the change meeting and exceeding a predetermined limit, a signal indicating that the speed command signal has changed to the control circuit to cause the control circuit to change a duty cycle of the pulse width modulation signal, the speed command signal specifying a target value of a rotational speed of the motor.

8 Claims, 22 Drawing Sheets

MOTOR CONTROL CIRCUIT AND MOTOR CONTROLLER

CROSS-REFERENCE TO RELATED APPLICATION

This application is based upon and claims priority under 35 U.S.C. § 119 to Japanese Patent Application No. 2018-182505 filed Sep. 27, 2018, the entire contents of which are incorporated herein by reference in their entirety.

BACKGROUND OF THE INVENTION

1. Field of the Invention

The present disclosure relates to a motor control circuit and a motor controller for controlling a switching operation of an inverter circuit that supplies an alternating current power to a motor.

2. Description of the Related Art

Japanese Unexamined Patent Application Publication No. 2018-107914, which is hereafter referred to as Patent Literature 1, discloses a technique of controlling a switching operation of an inverter circuit. Control of a motor is directed to an operation to change a duty cycle of a pulse width modulation (PWM) signal such that a rotational speed of the motor follows a value of a speed command signal. The PWM signal allows for operational control of a switching element of an inverter circuit.

SUMMARY OF THE INVENTION

The present disclosure provides a motor control circuit including: a control circuit configured to output a pulse width modulation signal for controlling a switching operation of an inverter circuit, the inverter circuit being configured to supply an alternating current power to a motor; and a speed-change detecting circuit configured to: detect a change in a speed command signal, and in response to the change meeting and exceeding a predetermined limit, output a signal indicating that the speed command signal has changed to the control circuit to cause the control circuit to change a duty cycle of the pulse width modulation signal, the speed command signal specifying a target value of a rotational speed of the motor.

DESCRIPTION OF THE PREFERRED EMBODIMENTS

With respect to the technique of controlling a switching operation in disclosed in Patent Literature 1, the inventors have recognized that a control unit has functions of operating in control of a motor including determining whether a motor malfunctions or deteriorates, etc. as well as determining whether a speed command signal changes. In such a manner, the control unit increases a processing load compared to a case of controlling a motor only. For this reason, responsiveness to control of the motor in accordance with a change in a speed command signal is decreased, and thereby accuracy of control of a motor may be decreased.

In view of the points recognized by the inventors, one or more embodiments provide a motor control circuit whereby it is possible to decrease a processing load of a control unit that has a function of operating in control of a motor, as well as providing a motor control circuit capable of increasing accuracy of control of a motor.

Hereinafter, a configuration of a motor control circuit and a motor control unit according to embodiments will be described in detail with reference to the drawings. Note that the present disclosure is not limited to the embodiments.

First Embodiment

Figure 1:
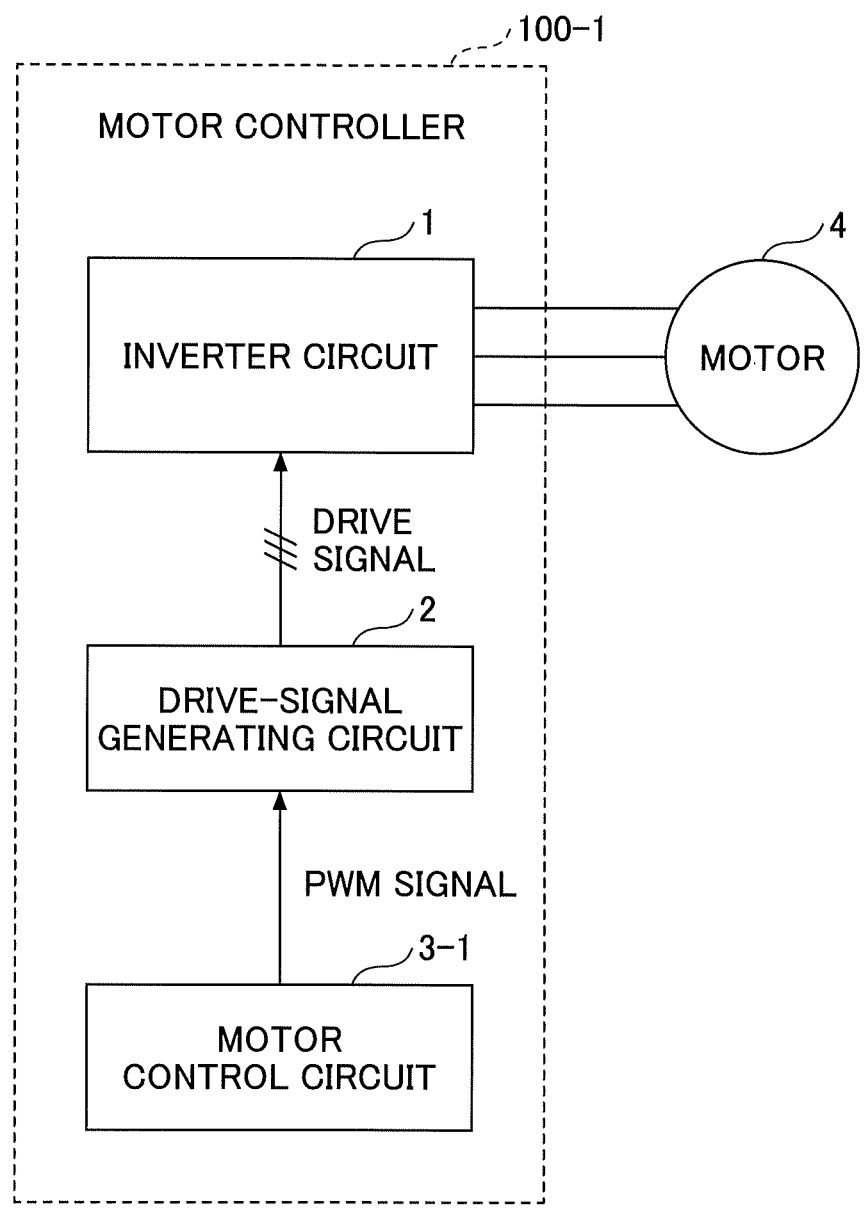
FIG. 1 is a diagram illustrating an example of a configuration of a motor controller according to a first embodiment.

FIG. 1 is a diagram illustrating an example of a configuration of a motor controller according to a first embodiment. A motor controller 100-1 includes an inverter circuit 1 for supplying an alternating current (AC) power to a motor 4, and includes a drive-signal generating circuit 2 for generating a drive signal that causes at least one switching element provided in the inverter circuit 1 to operate. The motor controller 100-1 also includes a motor control circuit 3-1 that generates a pulse width modulation (PWM) signal for controlling an operation of the switching element of the inverter circuit 1. In FIG. 1, a rectifier circuit for supplying a direct current (DC) power to the inverter circuit 1, a converter circuit, an alternating current (AC) power supply, and the like are not illustrated. The motor 4 is a rotating electrical machine that rotates by AC power. A drive signal is a voltage signal into which a PWM signal inputted to the drive-signal generating circuit 2 is converted, and the voltage signal can cause the switching element to drive. The PWM signal is a rectangular wave signal represented by two values of a high level or a low level for controlling a switching operation.

Figure 2:
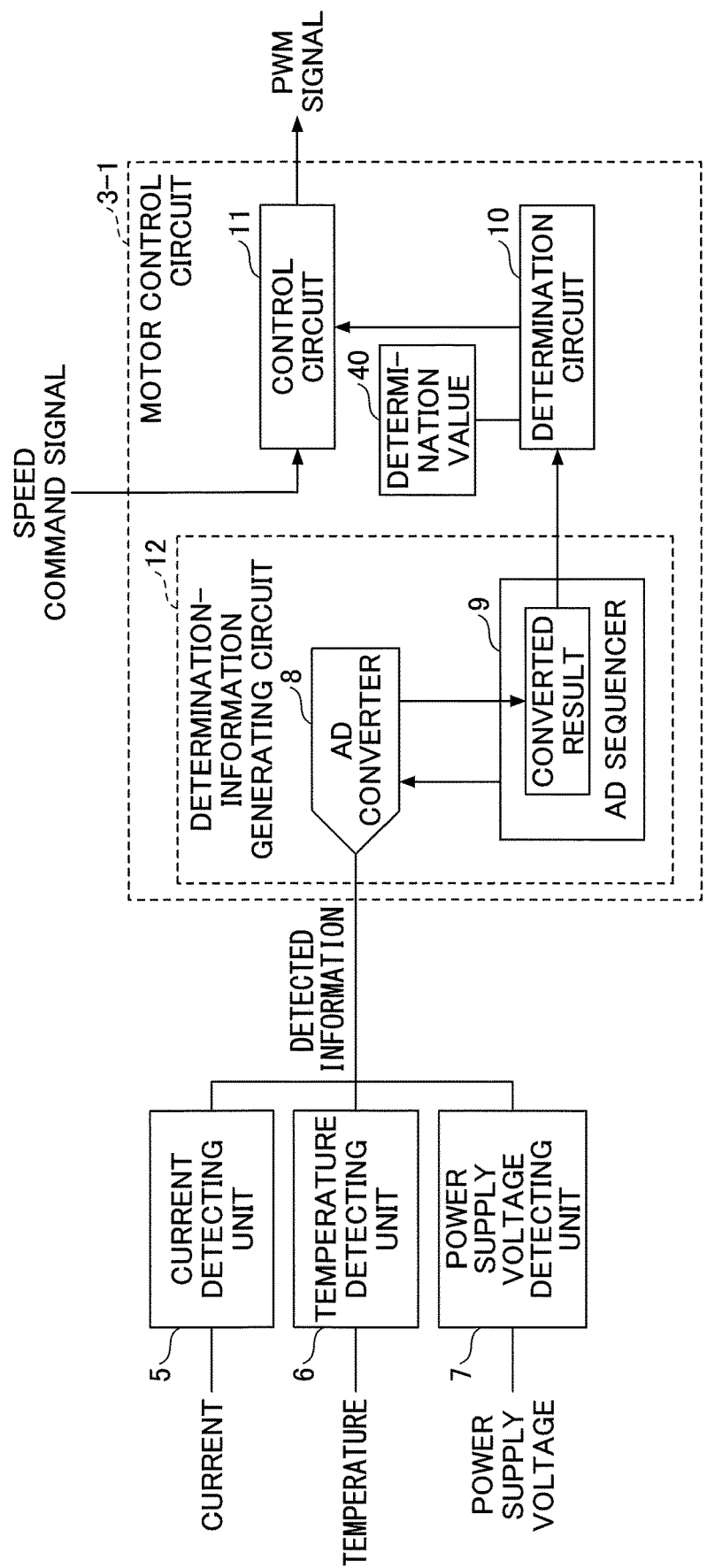
FIG. 2 is a diagram illustrating an example of a configuration of a motor control circuit according to the first embodiment.

Hereafter, a configuration of the motor control circuit 3-1 will be described. FIG. 2 is a diagram illustrating an example of a configuration of the motor control circuit according to the first embodiment. The motor control circuit 3-1 includes a control circuit 11 for generating a PWM signal, and includes a determination-information generating circuit 12 for generating determination information for determining a malfunction or deterioration of the motor 4. The motor control circuit 3-1 also includes a determination circuit 10. The determination circuit 10 determines whether or not the motor 4 malfunctions or deteriorates based on determination information generated by the determination-information generating circuit 12, and outputs, as an interrupt signal, a signal indicating that the motor 4 malfunctions or deteriorates to the control circuit 11 that has a function of operating in control of a motor. The determination circuit 10 is a circuit that allows for a decrease in processing loads of the control circuit 11, by substituting processing of operating in a control circuit known to the inventors. Note that deterioration of the motor 4 is determined by detecting a small change in determination information in measuring the determination information for a preset long period of time.

Determination information generated by the determination-information generating circuit 12 is information indicative of a digital value, into which at least one of the following: detected information of a current that indicates a current value detected by a current detecting unit 5; detected information of temperature that indicates a temperature value detected by a temperature detecting unit 6; and detected information of a voltage that indicates a value of a power supply voltage detected by a power supply voltage detecting unit 7, is converted by an AD converter 8. Note that detected information inputted to the determination-information generating circuit 12 may be information used to determine whether the motor 4 malfunctions or deteriorates. Such detected information is not limited to detected information of a current, detected information of temperature, and detected information of a voltage. As described above, the determination information generated by the determination-information generating circuit 12 is information obtained as a result of conversion of detected information, which is detected by the current detecting unit 5 or the like, into a digital value, via the AD converter 8. In the following description, the determination information may be referred to as a "converted result".

The determination-information generating circuit 12 includes an AD converter 8 and an AD sequencer 9. The AD converter 8 converts, into a digital value, at least one of: detected information of a current; detected information of temperature; and detected information of a voltage, and outputs a converted result to the AD sequencer 9. The AD sequencer 9 records the converted result, and the converted result recorded by the AD sequencer 9 is read to the determination circuit 10.

In the determination circuit 10, a determination value 40, which is compared with each of items of detected information of a current, detected information of temperature and detected information of a voltage, is set. For example, the determination value 40 is set with reference to a current, temperature, and a power supply voltage detected when the motor 4 malfunctions or deteriorates.

Figure 3:
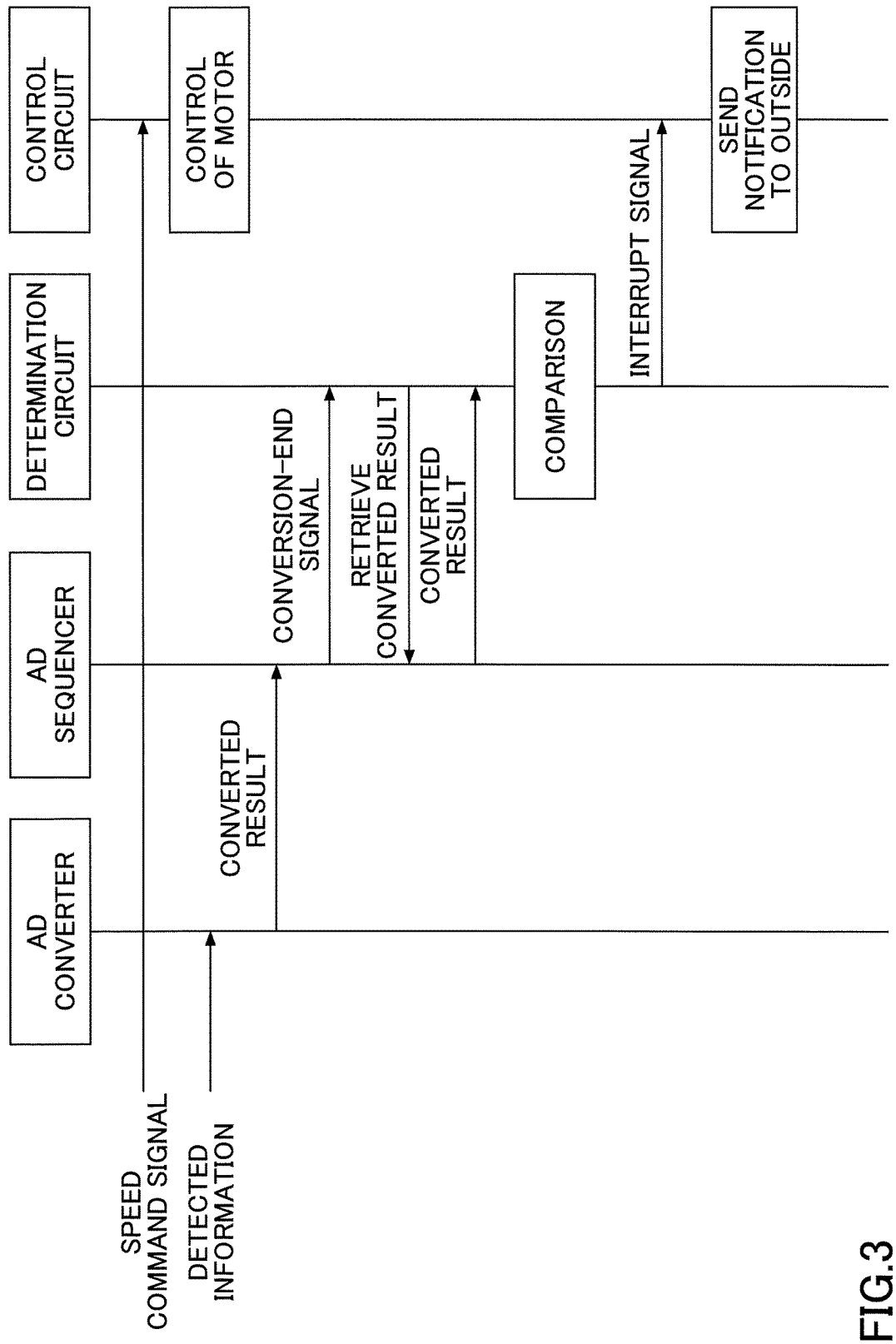
FIG. 3 is a sequence diagram for explaining an example of an operation of the motor control circuit according to the first embodiment.
Figure 4:
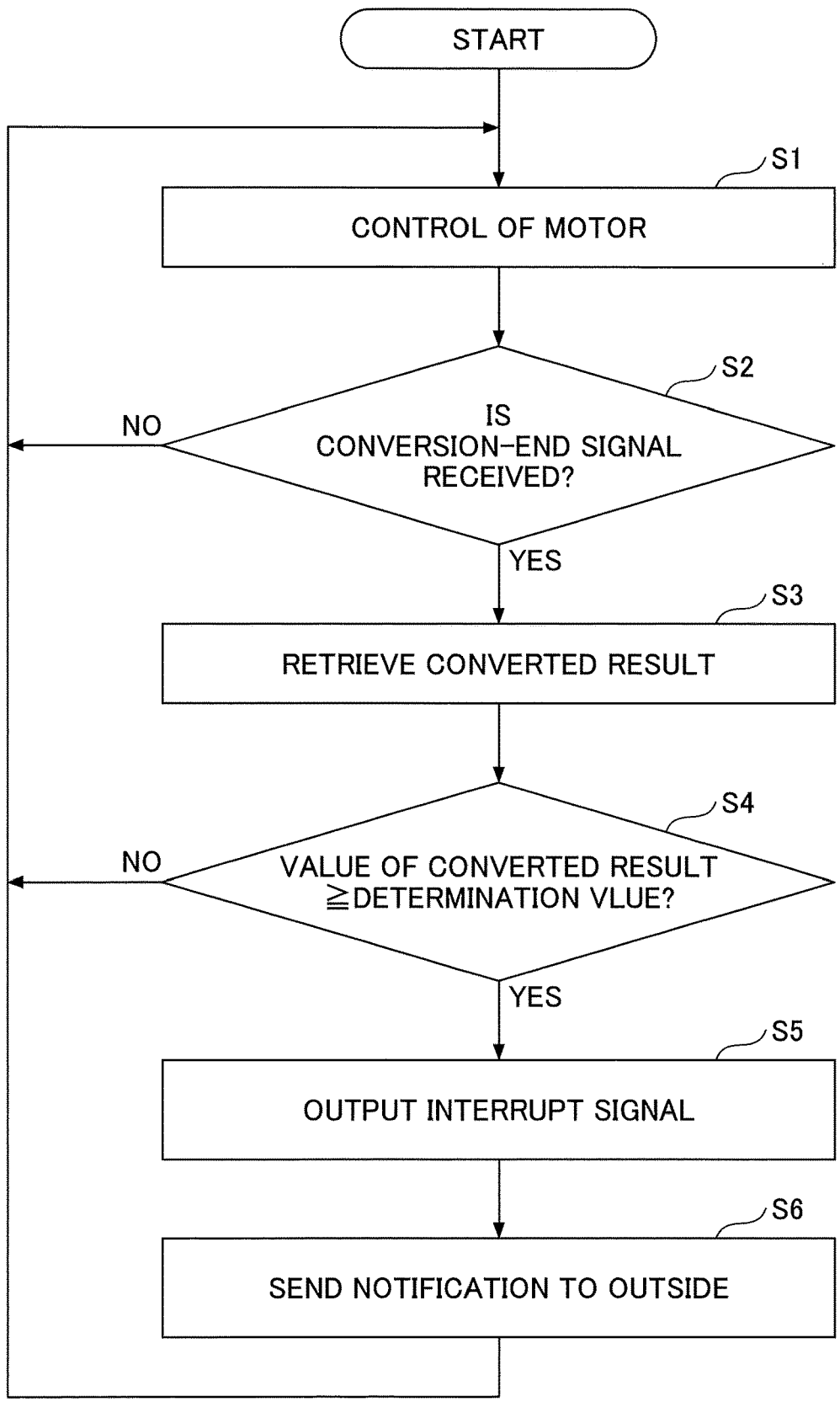
FIG. 4 is a flowchart for explaining an example of an operation of the motor control circuit according to the first embodiment.

Hereafter, an operation of the motor control circuit 3-1 will be described. FIG. 3 is a sequence diagram for explaining an example of an operation of the motor control circuit according to the first embodiment. FIG. 4 is a flowchart for explaining an example of an operation of the motor control circuit according to the first embodiment. The control circuit 11 performs control of a motor based on a speed command signal (step S1). The speed command signal is a signal specifying a target value of a rotational speed of the motor 4.

The AD converter 8, which has received at least one of: detected information of a current; detected information of temperature; and detected information of a voltage, converts a value of the at least one detected information into a digital value capable of being processed by the AD sequencer 9. The AD sequencer 9 records a converted result for each cycle, and outputs a conversion-end signal every time a cycle ends. The conversion-end signal is a signal indicating that recording of a converted result in a given cycle has been stopped.

The determination circuit 10 determines whether or not a conversion-end signal is received (step S2). When a conversion-end signal is not received (No in step S2), the process in step S1 and step S2 is repeated. When a conversion-end signal is received (Yes in step S2), the determination circuit 10 retrieves a converted result recorded by the AD sequencer 9 (step S3).

The determination circuit 10 compares a value obtained as the retrieved converted result with a preset determination value 40, and determines whether or not the value of the converted result is greater than or equal to the determination value 40 (step S4). When the value of the converted result is smaller than the determination value 40 (No in step S4), the process from step S1 to step S4 is repeated. When the value of the converted result is greater than or equal to the determination value 40 (Yes in step S4), the determination circuit 10 outputs an interrupt signal that is a signal for indicating that a value of a converted result is greater than or equal to the determination value 40 (step S5). The control circuit 11 that has received the interrupt signal sends a notification to the outside (step S6). For example, the control circuit 11 outputs, to the external device, a signal for indicating that the motor 4 malfunctions or deteriorates.

Figure 5:
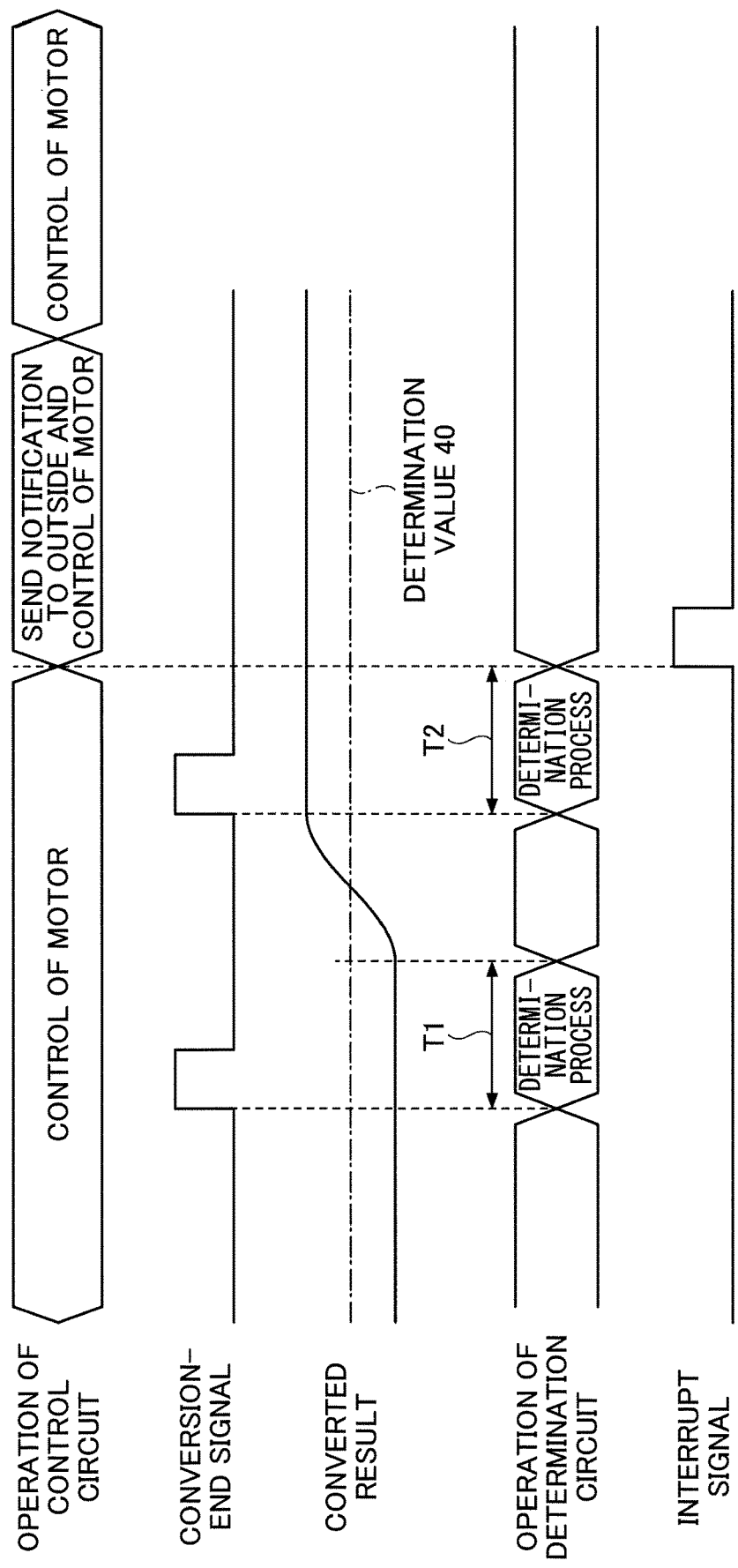
FIG. 5 is a time chart for explaining an operation of the motor control circuit according to the first embodiment.

FIG. 5 is a time chart for explaining an operation of the motor control circuit according to the first embodiment. FIG.

5 illustrates an operational state of the control circuit 11, timing at which a conversion-end signal changes, converted results, timing at which a determination process is performed by the determination circuit 10, and timing at which an interrupt signal changes. When the control circuit 11 performs control of the motor, in a case of a first conversion-end signal changing from Low to High, the determination circuit 10 performs a determination process until a certain period T1 elapses from a point at which the conversion-end signal changes from Low to High. The determination process corresponds to the process in step S4 in which it is determined whether or not a value of a converted result is greater than or equal to the determination value 40. Since the determination process is performed by the determination circuit 10, control of the motor performed by the control circuit 11 is not interrupted. In such a determination process, for example, when a value indicative of detected information of a current is smaller than the determination value 40, an interrupt signal indicates Low. Note that a conversion-end signal changes from Low to High and then changes to Low again.

When control of the motor is performed, in a case of a second conversion-end signal changing from Low to High, the determination circuit 10 performs a determination process to determine whether the motor 4 malfunctions or deteriorates until a certain period T2 elapses from a point at which the conversion-end signal changes from Low to High. In such a determination process, for example, when a value indicative of detected information of a current is greater than or equal to the determination value 40, an interrupt signal changes from Low to High. Thereby, control of the motor performed by the control circuit 11 is interrupted, and then a notification is sent to the outside.

Figure 6:
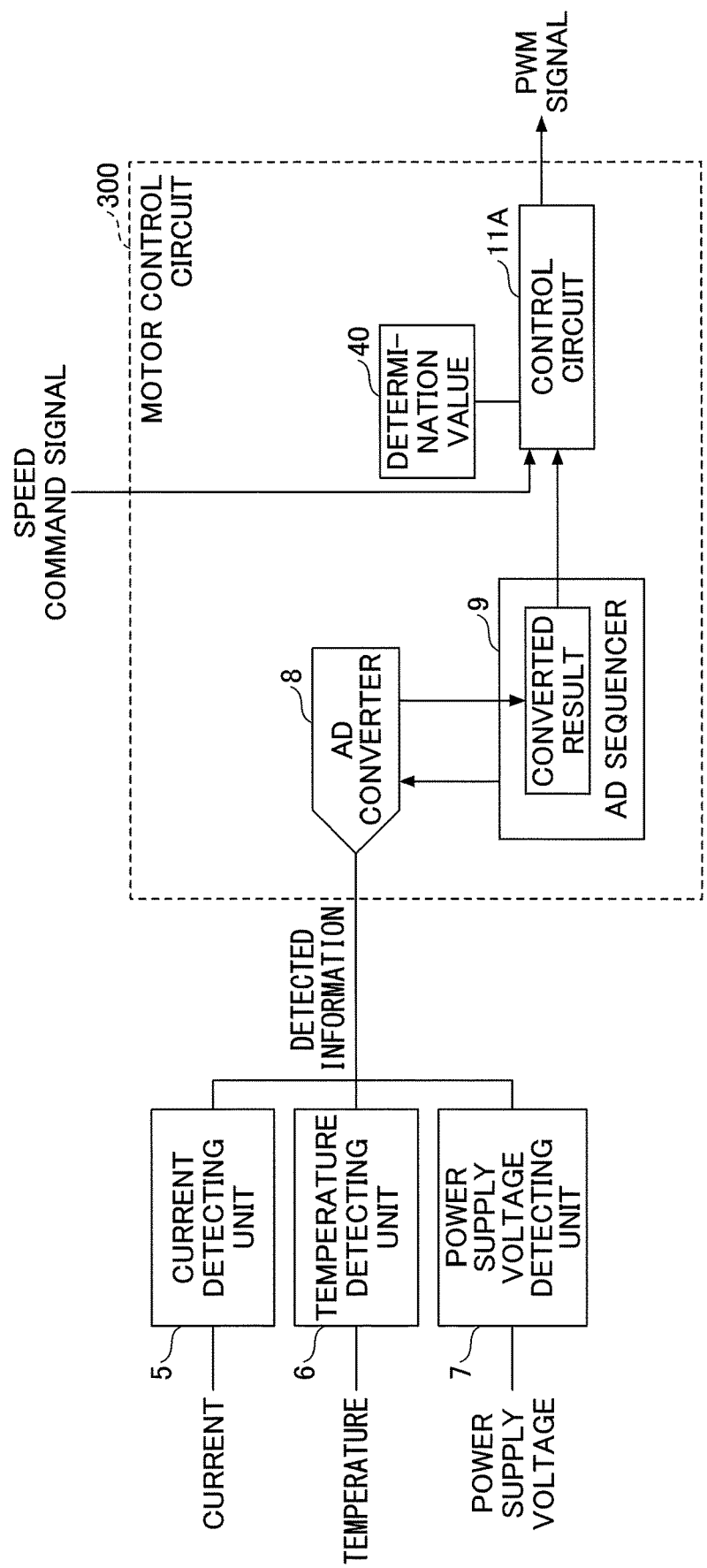
FIG. 6 is a diagram illustrating a configuration of a motor control circuit in a comparative example of the first embodiment.

FIG. 6 is a diagram illustrating a configuration of a motor control circuit in a comparative example of the first embodiment. A motor control circuit 300 illustrated in FIG. 6 includes a control circuit 11A, instead of the determination circuit 10 and the control circuit 11 illustrated in FIG. 2. The control circuit 11A performs control of a motor and a determination process in the manner as described above.

Figure 7:
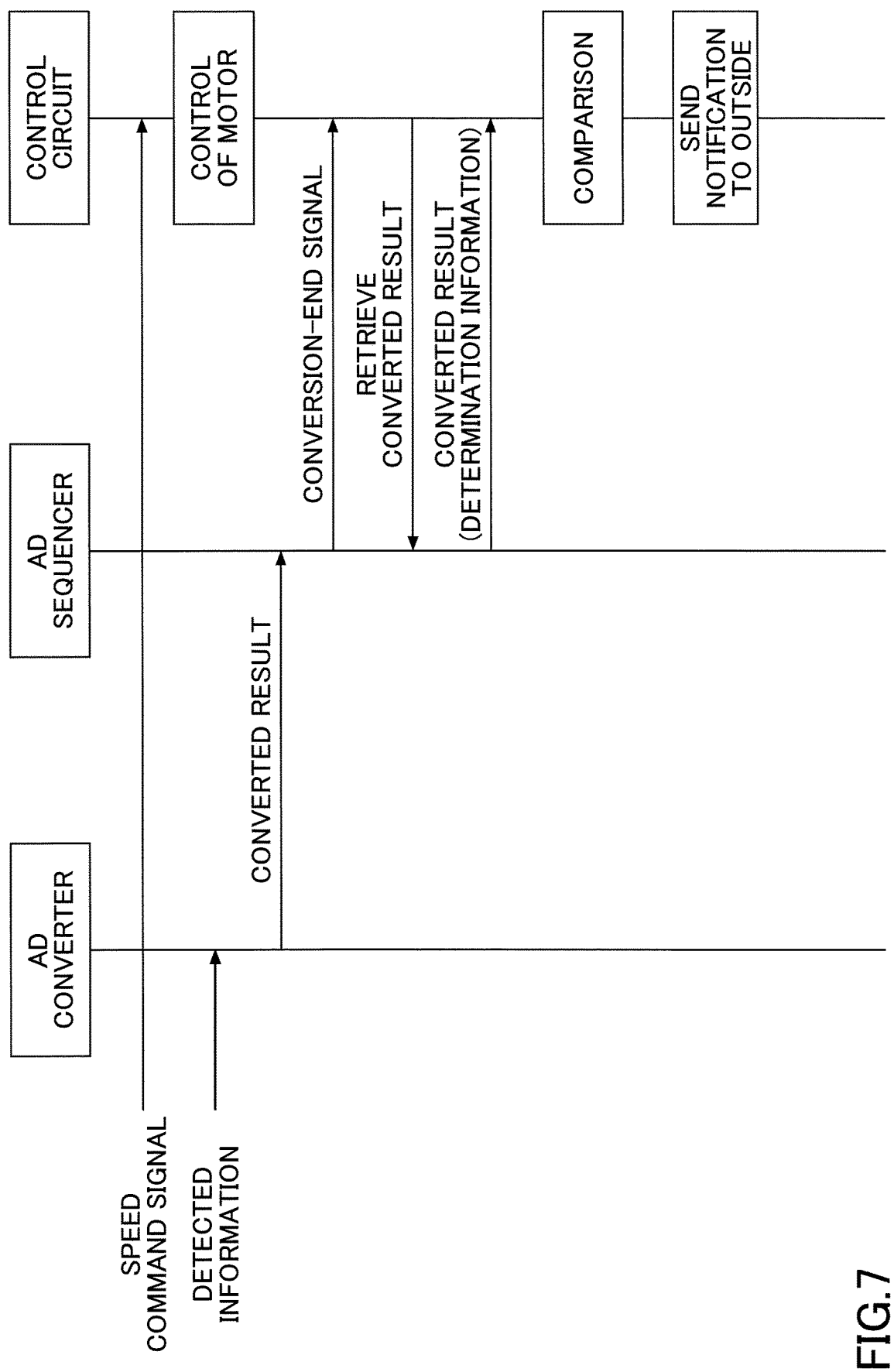
FIG. 7 is a sequence diagram for explaining an operation of a motor control circuit in the comparative example of the first embodiment.
Figure 8:
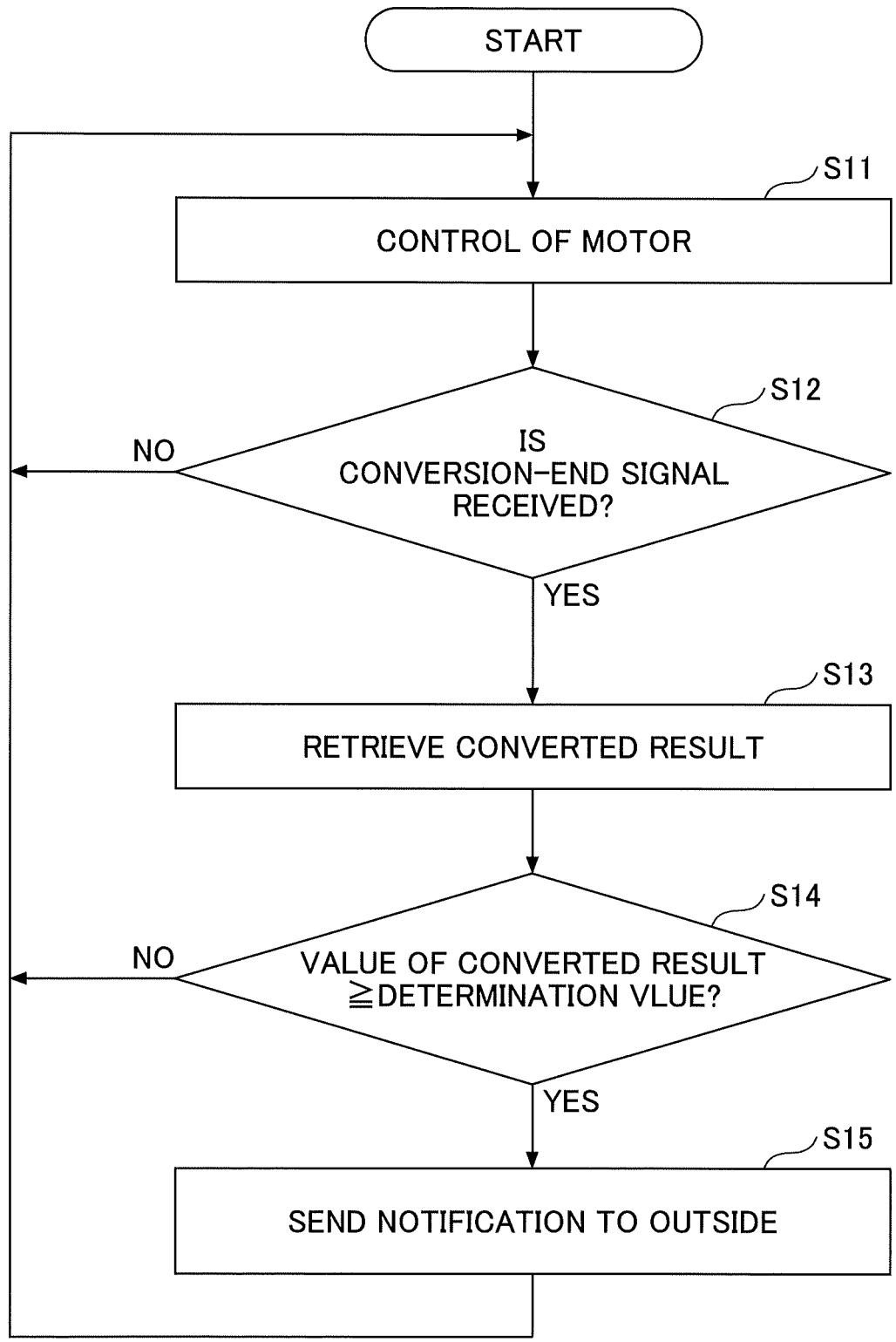
FIG. 8 is a flowchart for explaining an operation of the motor control circuit in the comparative example of the first embodiment.

Hereafter, an operation of the motor control circuit 300 will be described. FIG. 7 is a sequence diagram for explaining an operation of the motor control circuit in the comparative example of the first embodiment. FIG. 8 is a flowchart for explaining an operation of the motor control circuit in the comparative example of the first embodiment. The control circuit 11A performs control of a motor based on a speed command signal (step S11). An AD converter 8, which has received at least one of: detected information of a current; detected information of temperature; and detected information of a voltage, converts a value of the at least one detected information into a digital value capable of being processed by an AD sequencer 9. The AD sequencer 9 records a converted result for each regular cycle, and outputs a conversion-end signal every time a given cycle ends.

The control circuit 11A determines whether or not a conversion-end signal is received (step S12). When a conversion-end signal is not received (No in step S12), the process in step S11 and step S12 is repeated. When a conversion-end signal is received (Yes in step S12), the control circuit 11A retrieves a converted result recorded by the AD sequencer 9 (step S13).

The control circuit 11A compares a value obtained as the retrieved converted result with a preset determination value 40, and determines whether or not the value of the converted result is greater than or equal to the determination value 40 (step S14). When the value of the converted result is smaller than the determination value 40 (No in step S14), the process from step S11 to step S14 is repeated. When the value of the converted result is greater than or equal to the determination value 40 (Yes in step S14), the control circuit 11A sends a notification to the outside (step S15).

Figure 9:
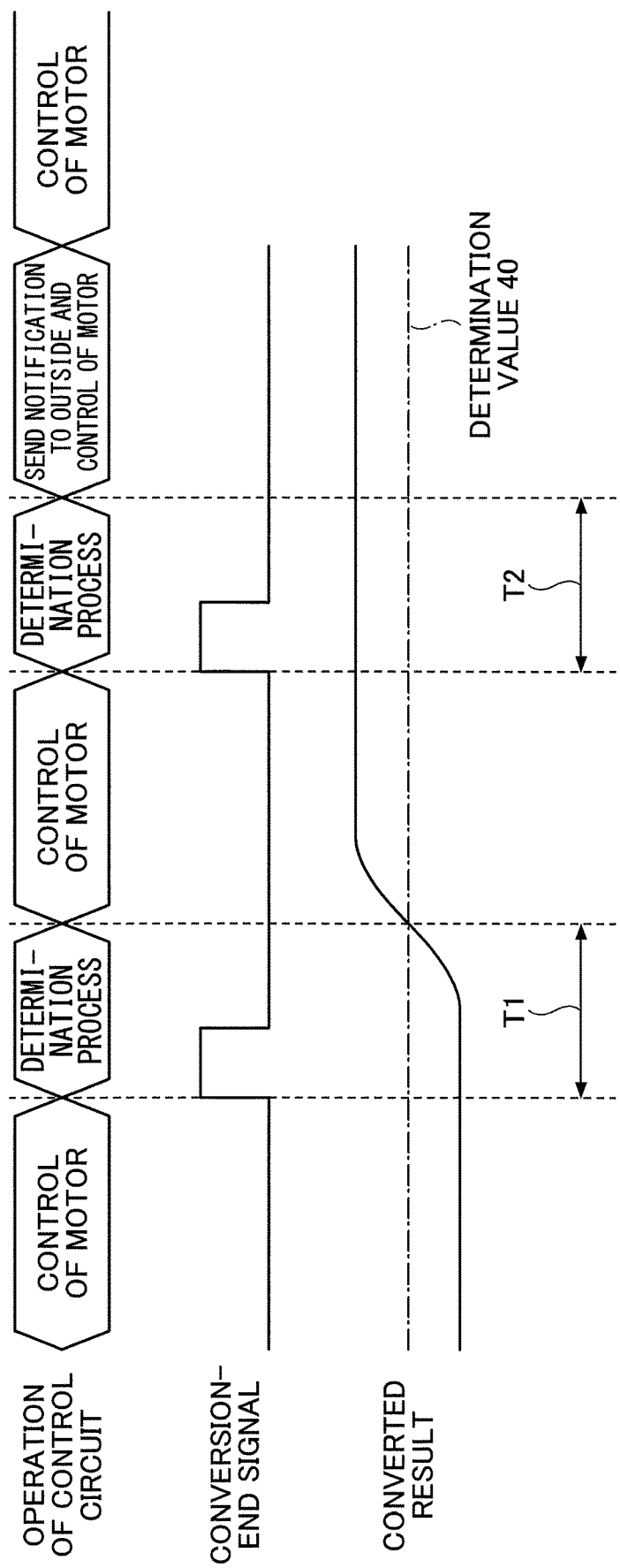
FIG. 9 is a time chart for explaining an operation of the motor control circuit in the comparative example of the first embodiment.

FIG. 9 is a time chart for explaining an operation of the motor control circuit in the comparative example of the first embodiment. FIG. 9 illustrates an operational state of the control circuit 11A, timing at which a conversion-end signal changes, and converted results. In a case where the control circuit 11A performs control of a motor, when a first conversion-end signal changes from Low to High, the control circuit 11A performs a determination process, instead of control of a motor, until a certain period T1 elapses from a point at which the conversion-end signal changes from Low to High. The determination process corresponds to the process in step S14 in which it is determined whether or not a value of a converted result is greater than or equal to the determination value 40. Since the determination process is performed by the control circuit 11A, control of the motor is interrupted until the certain period T1 elapses. In such a determination process, for example, when a value of detection information of a current is smaller than the determination value 40, a notification is not sent to the outside. Note that a conversion-end signal changes from Low to High and then changes to Low again.

The control circuit 11A again performs control of the motor after the certain period T1 elapses. In a case where control of the motor is performed, when a second conversion-end signal changes from Low to High, the control circuit 11A performs a determination process until a certain period T2 elapses from a point at which the conversion-end signal changes from Low to High. In such a determination process, for example, when a value of detected information of a current is greater than or equal to the determination value 40, a notification is sent to the outside when the certain period T2 elapses.

As described above, with respect to the motor control circuit 300 in the comparative example, the control circuit 11A performs a determination process in the certain periods T1 and T2 from respective points at each of which a given conversion-end signal changes from Low to High. In other words, the control circuit 11A determines whether or not the motor 4 malfunctions or deteriorates. Thereby, control of the motor is interrupted in the determination process.

On the other hand, with respect to the motor control circuit 3-1 according to the first embodiment, as illustrated in FIG. 5, the determination circuit 10 performs a determination process in the certain periods T1 and T2 from respective points at each of which a given conversion-end signal changes from Low to High. In other words, an operational process (determination process of malfunction) is performed for the determination circuit 10, instead of the control circuit 11A in the comparative example. Accordingly, with respect to the motor control circuit 3-1, a determination process of whether the motor 4 malfunctions or deteriorates, as well as control of the motor are performed concurrently. In such a manner, control of the motor is not interrupted in the determination process. As described above, since control of the motor is not interrupted, control of the motor can be changed immediately in response to a change in a speed command signal even when a value of a speed command signal changes in each of the certain periods T1 and T2 illustrated in FIG. 5, by way of example. Specifically, as an example, when a period within a cycle in which a speed command signal is on is increased, a duty cycle of a PWM signal is increased. When a period within a cycle in which a speed command signal is on is decreased, a duty cycle of a PWM signal is decreased. As a result, responsiveness to control of the motor in accordance with a change in a speed command signal is improved. Further, instead of the control circuit 11A, the determination circuit 10 performs an operational process (determination process of malfunction), thereby decreasing a processing load of the control circuit 11.

Also, even when a value of a speed command signal changes frequently in a short period, a duty cycle of a PWM signal can be changed without delay. Thereby, with the motor control circuit 3-1, the motor controller 100-1 can perform determination of malfunction or deterioration of a motor, etc. while enabling a complex control of motor operations. Further, a processing load of an operational process performed by the control circuit 11 is decreased, thereby allowing for a more complex control of motor operations. As a result of determination of malfunction or deterioration of a motor, etc., when a malfunction or deterioration is determined, it is possible to immediately send a notification to the outside.

Figure 10:
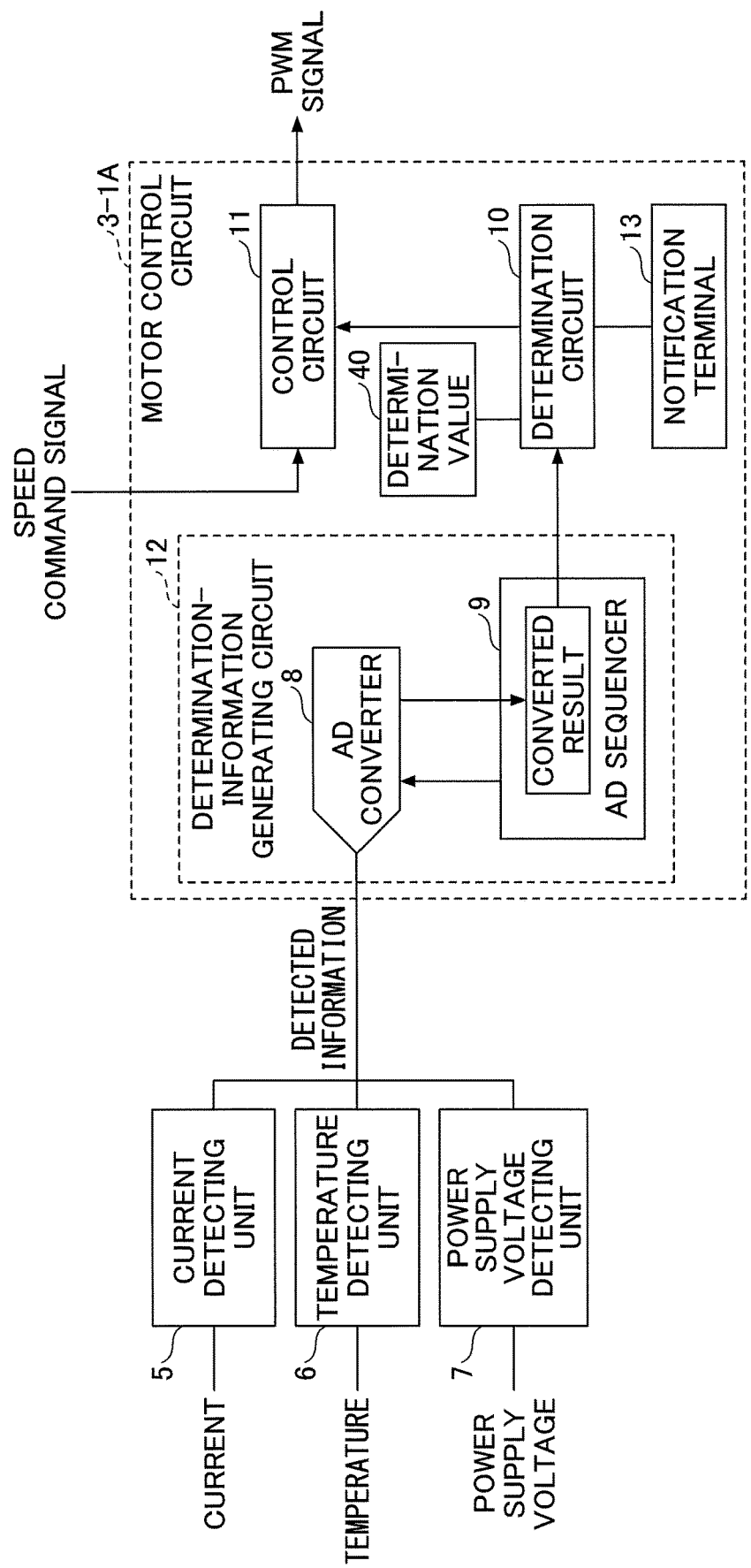
FIG. 10 is a diagram illustrating an example of a configuration of a motor control circuit according to modification of the first embodiment.

FIG. 10 is a diagram illustrating an example of a configuration of a motor control circuit according to modification of the first embodiment. A motor control circuit 3-1A illustrated in FIG. 10 includes a notification terminal 13. The notification terminal 13 is electrically coupled to a determination circuit 10, by way of example. The notification terminal 13 is a terminal for indicating, to a circuit provided outside of the motor control circuit 3-1A, information on at least one of a malfunction of a motor 4 and deterioration of the motor 4. Note that, as an example, the notification terminal 13 includes: a metal terminal disposed on a printed circuit board in which a determination-information generating circuit 12, the determination circuit 10 and a control circuit 11 are provided; a terminal of a processor that serves as the determination circuit 10; or the like.

When a value obtained as a converted result is greater than or equal to a determination value 40, the determination circuit 10 increases a voltage value applied to the notification terminal 13. In contrast, when a value obtained as a converted result is smaller than a determination value 40, the determination circuit 10 decreases a voltage value applied to the notification terminal 13. In other words, a voltage applied to the notification terminal 13 is changed to have a different value. A circuit provided outside of the motor control circuit 3-1A can detect a malfunction or deterioration of the motor 4 by detecting an amount of change in voltages applied to the notification terminal 13, where the amount of change is greater than a preset value for detecting a malfunction or deterioration of the motor 4, by way of example.

As described above, with a notification terminal 13 being provided, in response to a change in voltages, a malfunction or deterioration of a motor 4, etc. is indicated to the external circuit via the notification terminal 13, even when the control circuit 11 does not send a notification to the outside. In such a manner, the control circuit 11 does not need to send a notification to the outside. Thereby, a processing load of an operational process performed by the control circuit 11 is further decreased.

Second Embodiment

Figure 11:
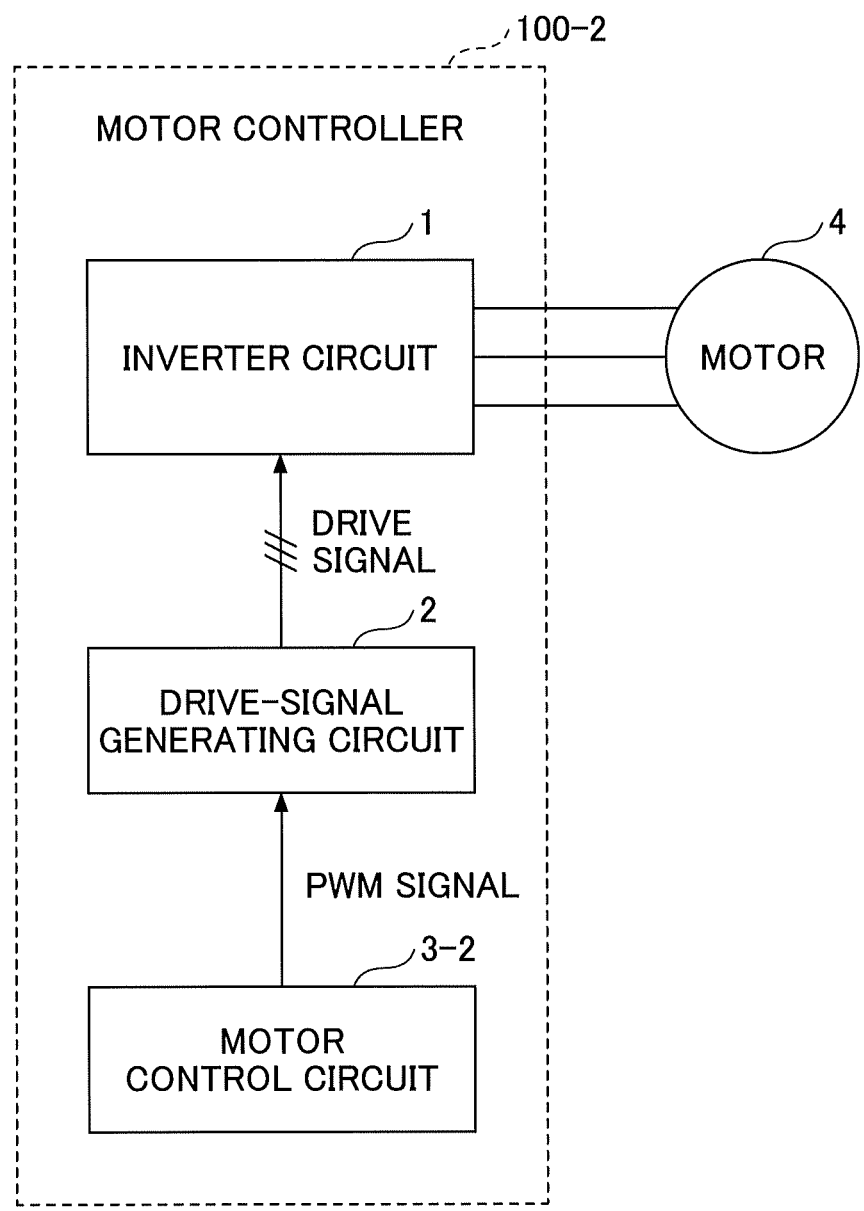
FIG. 11 is a diagram illustrating an example of a configuration of a motor controller according to a second embodiment.

FIG. 11 is a diagram illustrating an example of a configuration of a motor controller according to a second embodiment. In the following description, the same reference numerals are used to denote same elements as the first embodiment; accordingly, for the same elements, the explanation may be omitted, and different elements will be described. A motor controller 100-2 according to the second embodiment includes a motor control circuit 3-2 instead of the motor control circuit 3-1 according to the first embodiment.

Figure 12:
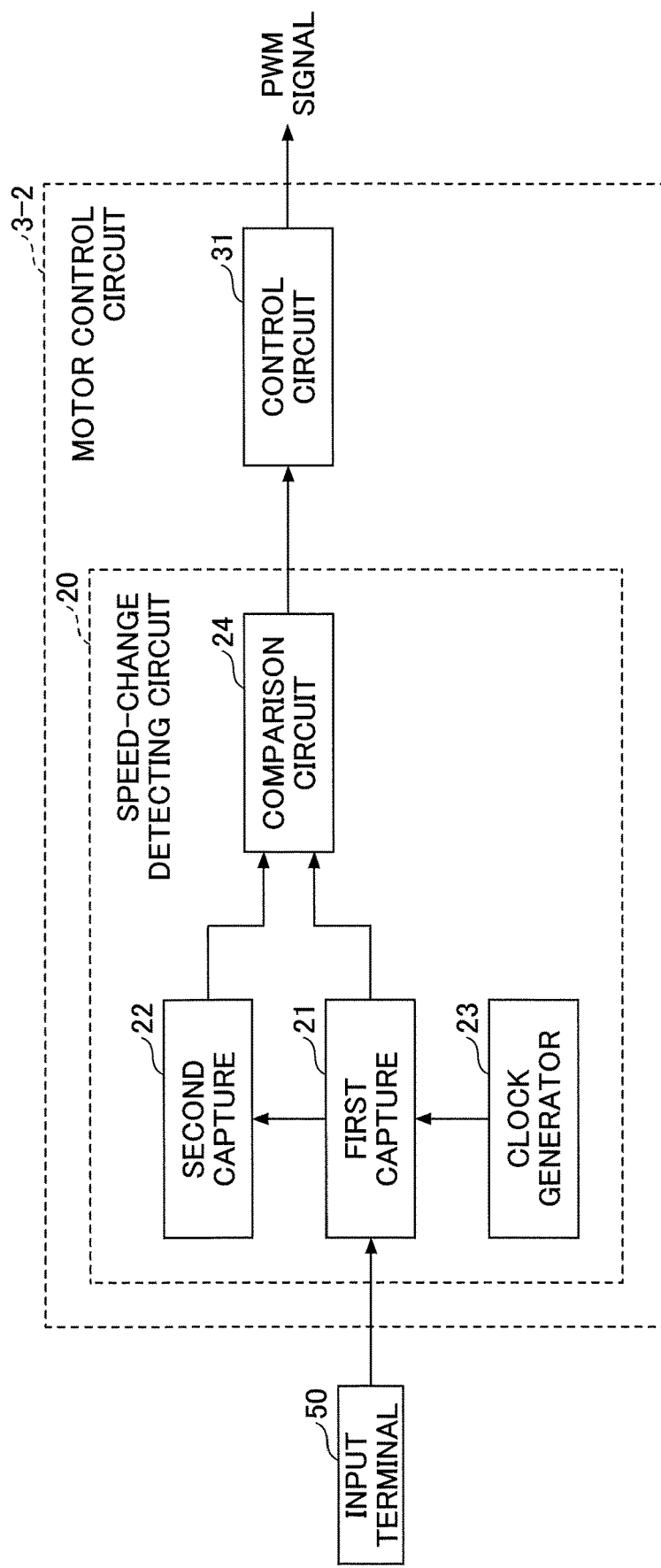
FIG. 12 is a diagram illustrating an example of a configuration of a motor control circuit according to the second embodiment.
Figure 13:
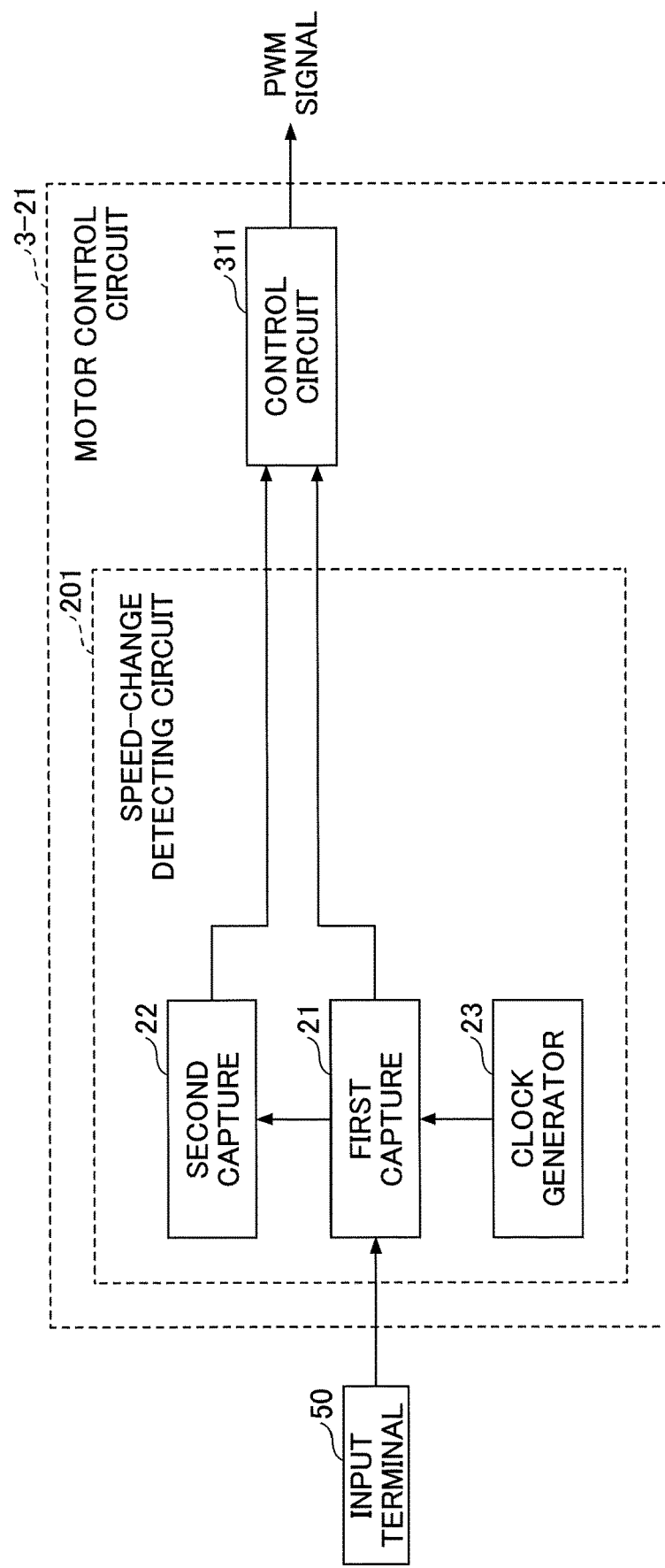
FIG. 13 is a diagram illustrating a configuration of a motor control circuit known to the inventors.

FIG. 12 is a diagram illustrating an example of a configuration of the motor control circuit according to the second embodiment. The motor control circuit 3-2 according to the second embodiment includes a control circuit 31 for generating a PWM signal, and includes a speed-change detecting circuit 20. The speed-change detecting circuit 20 includes a first capture 21, a second capture 22, a clock generator 23, and a comparison circuit 24. FIG. 13 is a diagram illustrating a configuration of a motor control circuit known to the inventors. A typical motor control circuit 3-21 includes a control circuit 311 for generating a PWM signal, and a speed-change detecting circuit 201. The speed-change detecting circuit 201 includes a first capture 21, a second capture 22, and a clock generator 23. The clock generator 23 generates a clock signal in a regular cycle. In order to measure the time when a speed command signal indicates High, as an example, the first capture 21 counts a clock signal generated in a period from a first point, at which the speed command signal changes from Low to High, to a second point at which the speed command signal changes from High to Low. Further, the first capture 21 records a first count value obtained as a counted result. The first capture 21 is a register that records a first count value. The first count value in the first capture 21 is updated when a speed command signal changes from High to Low, by way of example. As an example, the second capture 22 copies a first count value recorded by the first capture 21 before the first count value is updated, and then records the copied first count value as a second count value. Such a second count value is recorded at a timing at which a speed command signal changes from High to Low, by way of example. The second capture 22 is a register that records a second count value. The typical control circuit 311 receives a most recent first count value recorded by the first capture 21, as well as a most recent second count value recorded by the second capture 22. The control circuit 311 detects a difference between a first count value and a second count value, e.g., a difference between speeds in a speed command signal. The control circuit 311 further performs operation to determine whether or not a difference between speeds is greater than or equal to a threshold (a predetermined limit). As described above, with respect to the typical motor control circuit 3-21, the control circuit 311 performs operation to determine whether a speed command signal changes. Such a control circuit 311 performs operation to determine whether a speed command signal is greater than or equal to a threshold in a regular cycle, even when the speed command signal has little difference between speeds. In contrast, with respect to the motor control circuit 3-2 according to the second embodiment, the comparison circuit 24 in the speed-change detecting circuit 20 determines whether a difference between speeds in a speed command signal is greater than or equal to a threshold. Only when a difference between speeds in a speed command signal is greater than or equal to a threshold, in response to receipt of a signal from the speed-change detecting circuit 20, the control circuit 31 is configured to change control of a motor. Thereby, a processing load of the control circuit 31 is decreased.

An input terminal 50 for inputting a speed command signal is coupled to the speed-change detecting circuit 20. The speed-change detecting circuit 20 detects a change in a speed command signal inputted via the input terminal 50.

The speed-change detecting circuit 20 further outputs, as an interrupt signal, a signal indicating that a speed command signal has changed to the control circuit 31 to cause the control circuit 31 to change a duty cycle of a PWM signal.

The comparison circuit 24 compares a most recent first count value recorded by the first capture 21 with a most recent second count value recorded by the second capture 22, detects a change in a speed command signal based on a compared result, and outputs a signal indicating that a speed command signal has changed.

Figure 14:
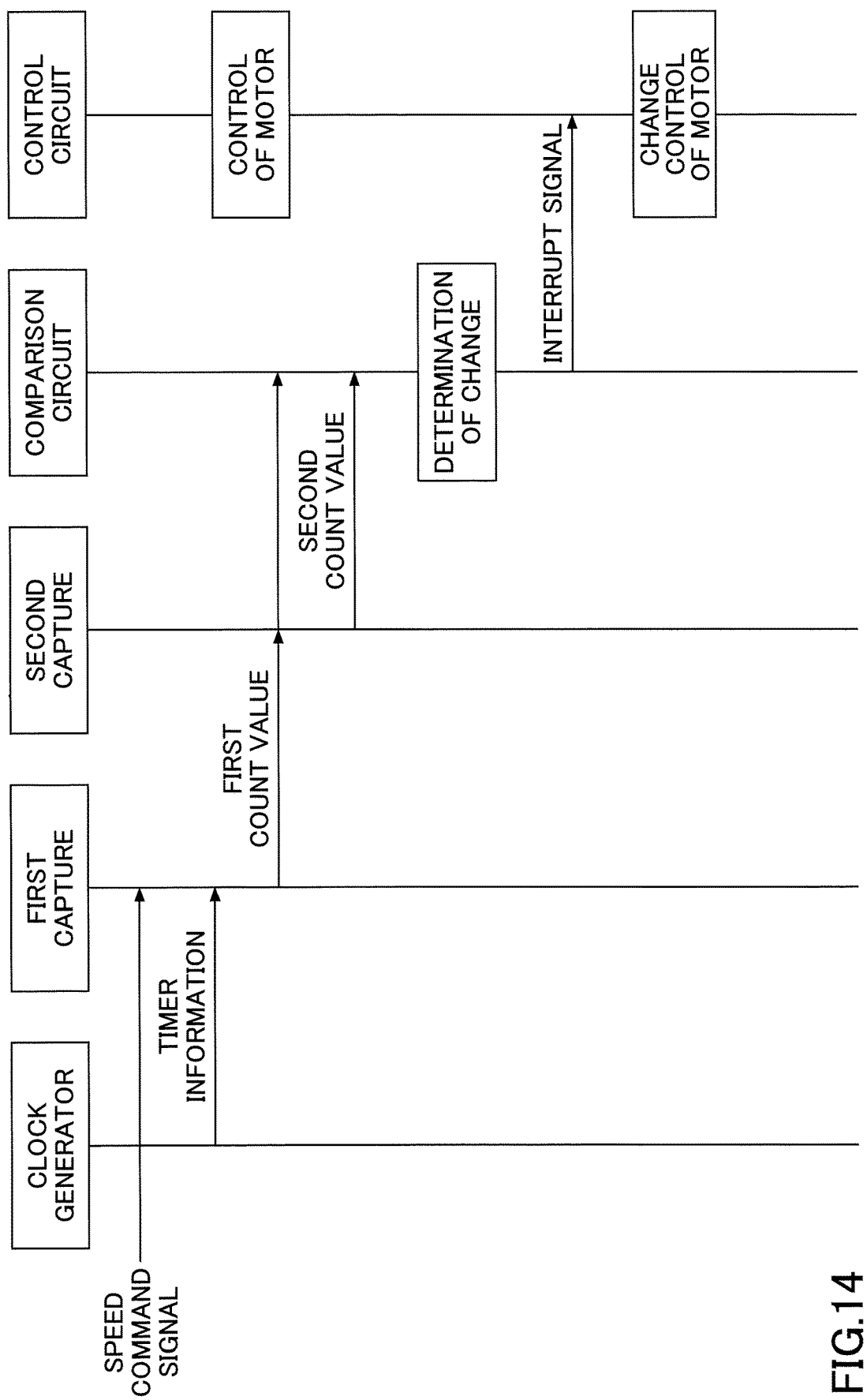
FIG. 14 is a sequence diagram for explaining an example of an operation of the motor control circuit according to the second embodiment.
Figure 15:
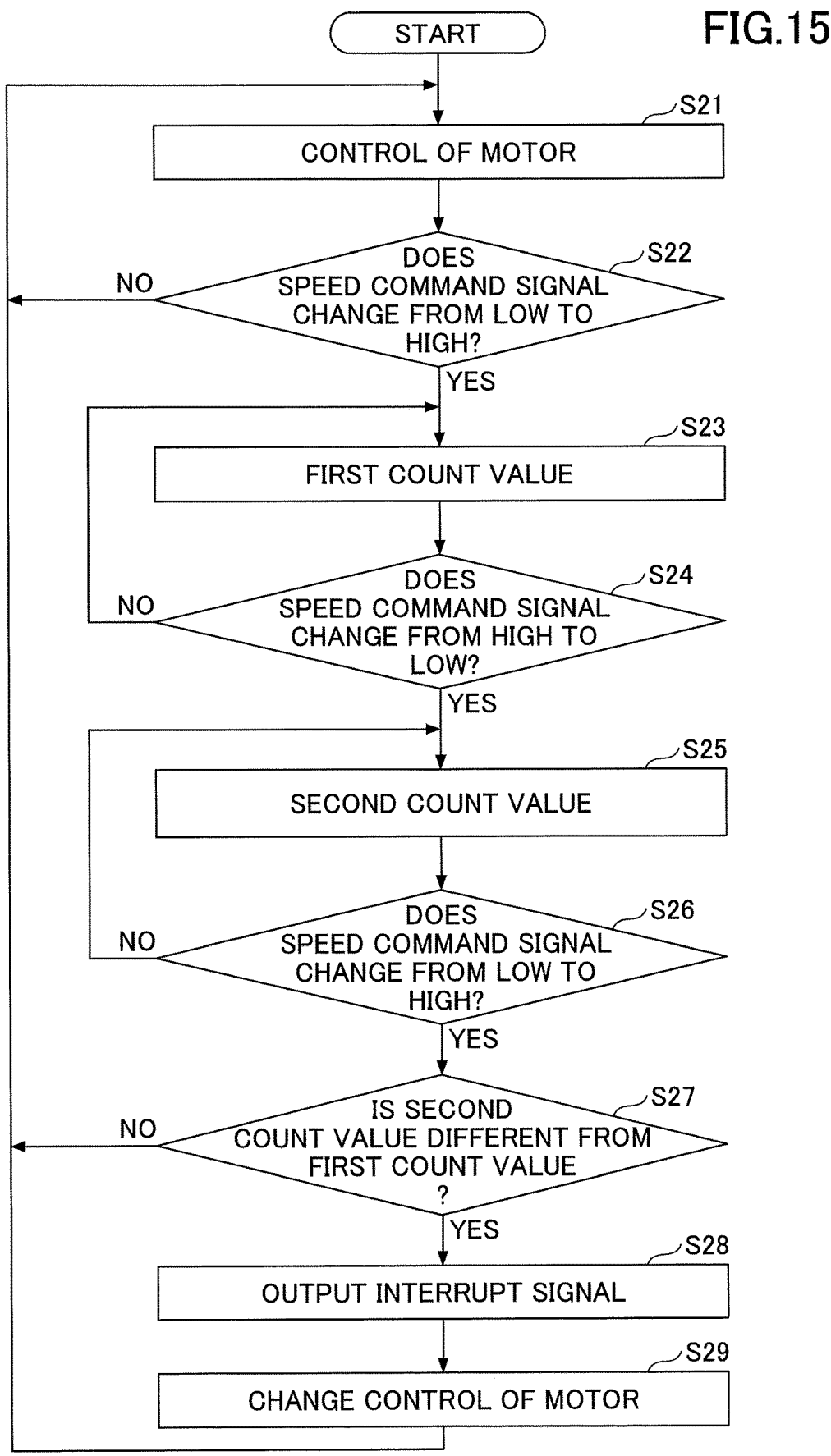
FIG. 15 is a flowchart for explaining an example of an operation of the motor control circuit according to the second embodiment.

Hereafter, an operation of the motor control circuit 3-2 will be described. FIG. 14 is a sequence diagram for explaining an example of an operation of the motor control circuit according to the second embodiment. FIG. 15 is a flowchart for explaining an example of an operation of the motor control circuit according to the second embodiment. The control circuit 31 performs control of a motor based on a speed command signal (step S21). When a speed command signal does not change from Low to High (No in step S22), the process in step S21 and step S22 is repeated. When a speed command signal changes from Low to High (Yes in step S22), the first capture 21 counts a clock signal to obtain a first count value (step S23).

Next, the process in step S23 and step S24 is repeated until the speed command signal changes from High to Low (No in step S24). When the speed command signal changes from High to Low (Yes in step S24), the first count value in the first capture 21 is updated. In this case, the second capture 22 records, as a second count value, a first count value immediately prior to the updated first count value.

The process in step S25 and step S26 is repeated until the speed command signal changes from Low to High (No in step S26). When the speed command signal changes from Low to High (Yes in step S26), the comparison circuit 24 compares the first count value with the second count value, and determines whether or not the second count value is different from the first count value (step S27). When the second count value is same as the first count value (No in step S27), the process from step S21 to step S27 is repeated. When the second count value is different from the first count value (Yes in step S27), the comparison circuit 24 outputs an interrupt signal (step S28). The control circuit 31 that has received the interrupt signal changes control of the motor (step S29).

Figure 16:
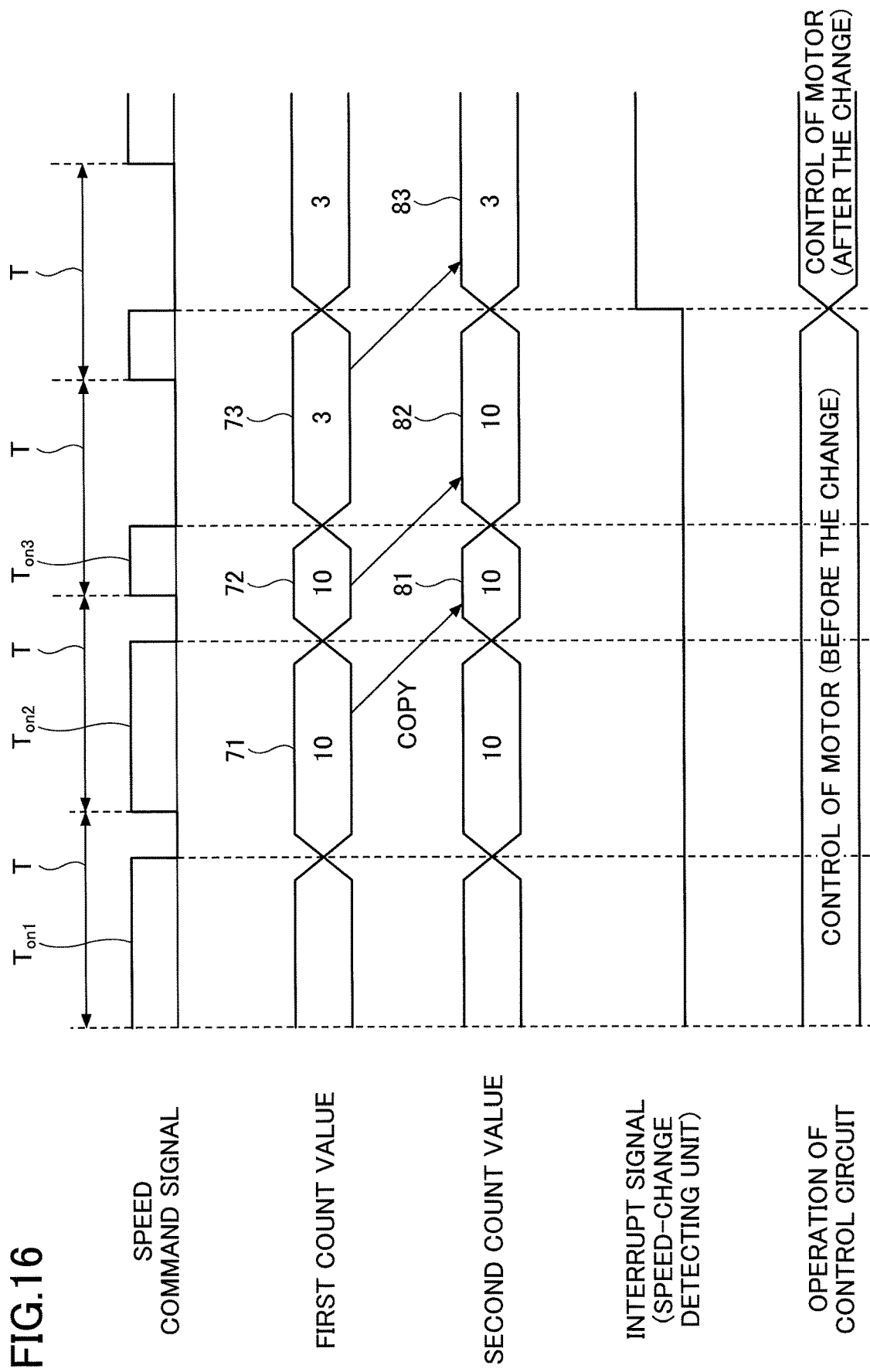
FIG. 16 is a time chart for explaining an example of an operation of the motor control circuit according to the second embodiment.

FIG. 16 is a time chart for explaining an example of an operation of the motor control circuit according to the second embodiment. FIG. 16 illustrates a speed command signal, first count values, second count values, an interrupt signal, and an operational state of the control circuit 31. An interval of time expressed by T is a cycle in which a speed command signal may change. Each of respective periods indicated by Ton1, Ton2, and Ton3 is the time when a speed command signal indicates High, i.e., a speed command signal indicates an on-cycle. Ton1 and Ton2 are equal in length, and Ton3 is shorter than each of Ton1 and Ton2. A first count value 71 recorded by the first capture 21 corresponds to Ton1 and is "10", for example. A first count value 72 corresponds to Ton2 and is "10", for example. A first count value 73 corresponds to Ton3 and is "3", for example. A second count value 81 recorded by the second capture 22 corresponds to the first count value 71 and is "10", for example. Similarly, a second count value 82 corresponds to the first count value 72 and is "10". A second count value 83 corresponds to the first count value 73 and is "3".

When the second count value 81 is compared with the first count value 72, an interrupt signal is maintained at Low because the second count value 81 is same as the first count value 72. In this case, an interrupt signal is not outputted. When the second count value 82 is compared with the first count value 73, an interrupt signal is changed from Low to High because the second count value 82 is different from the first count value 73. In this case, an interrupt signal is outputted. When an interrupt signal is outputted, the control circuit 31 determines that the speed command signal has changed, and generates a PWM signal such that a rotational speed of a motor 4 follows a value of the changed speed command signal. In other words, the control circuit 31 changes control of the motor. In the example of FIG. 16, because the second count value 82 is greater than the first count value 73, control of the motor is performed to increase a duty cycle of a PWM signal.

In the second embodiment, the speed-change detecting circuit 20 performs determination of change in speeds in a speed command signal. In such a manner, the motor control circuit 3-2 does not increase a processing load of an operational process in such determination of change in speeds in a speed command signal.

Figure 17:
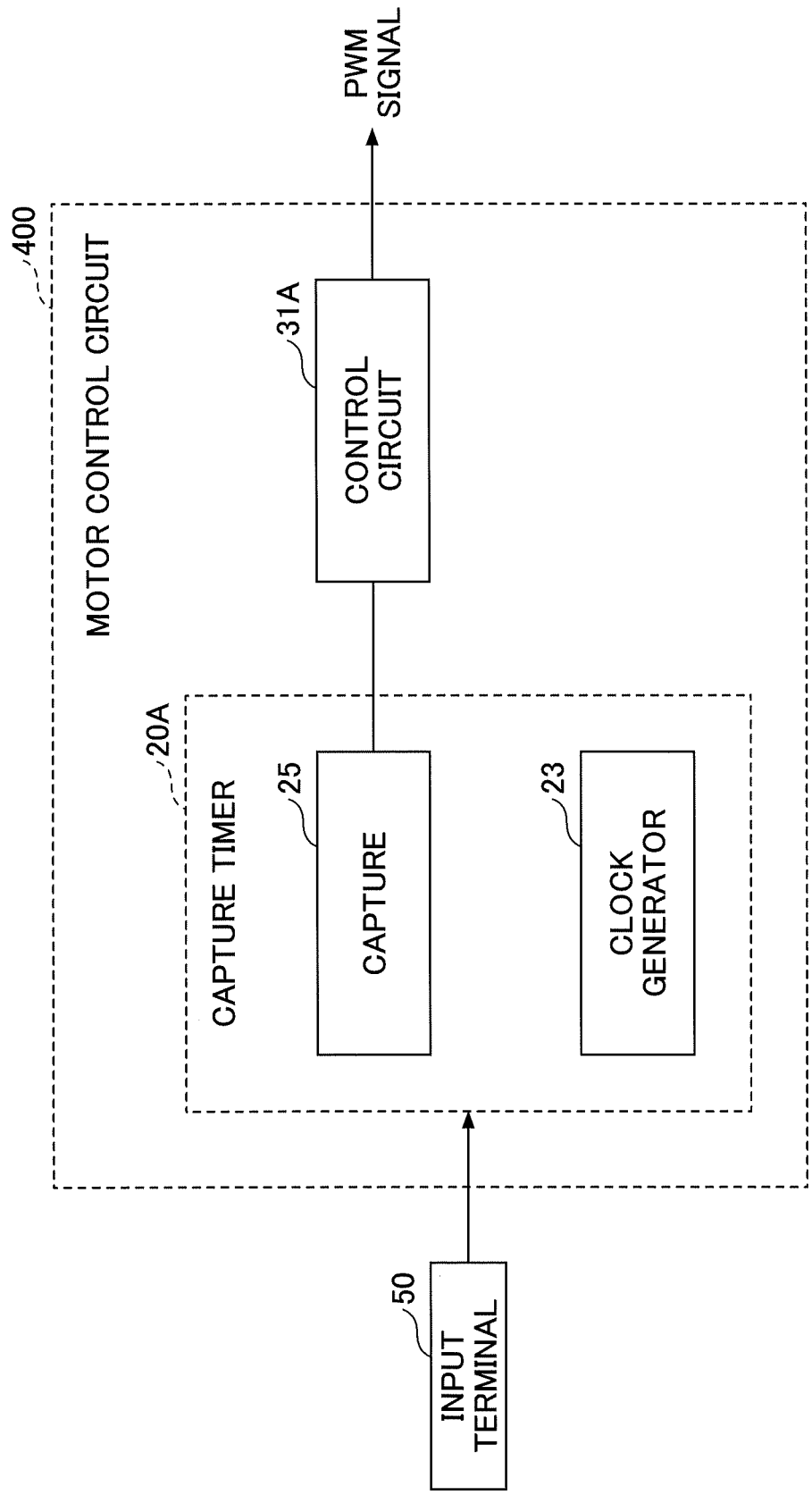
FIG. 17 is a diagram illustrating a configuration of a motor control circuit in a comparative example of the second embodiment.

FIG. 17 is a diagram illustrating a configuration of a motor control circuit in a comparative example of the second embodiment. As illustrated in FIG. 17, a motor control circuit 400 includes a capture timer 20A and a control circuit 31A, instead of the speed-change detecting circuit 20 and the control circuit 31 illustrated in FIG. 12. The control circuit 31A controls a motor and performs determination of change in speeds in a speed command signal. The capture timer 20A includes a clock generator 23 and a capture 25. In order to measure the time when a speed command signal indicates High, the capture 25 counts a clock signal generated in a period from a first point, at which a speed command signal changes from Low to High, to a second point at which the speed command signal changes from High to Low. Further, the capture 25 records a count value obtained as a counted result. The clock signal is a signal outputted from a clock generator 23.

Figure 18:
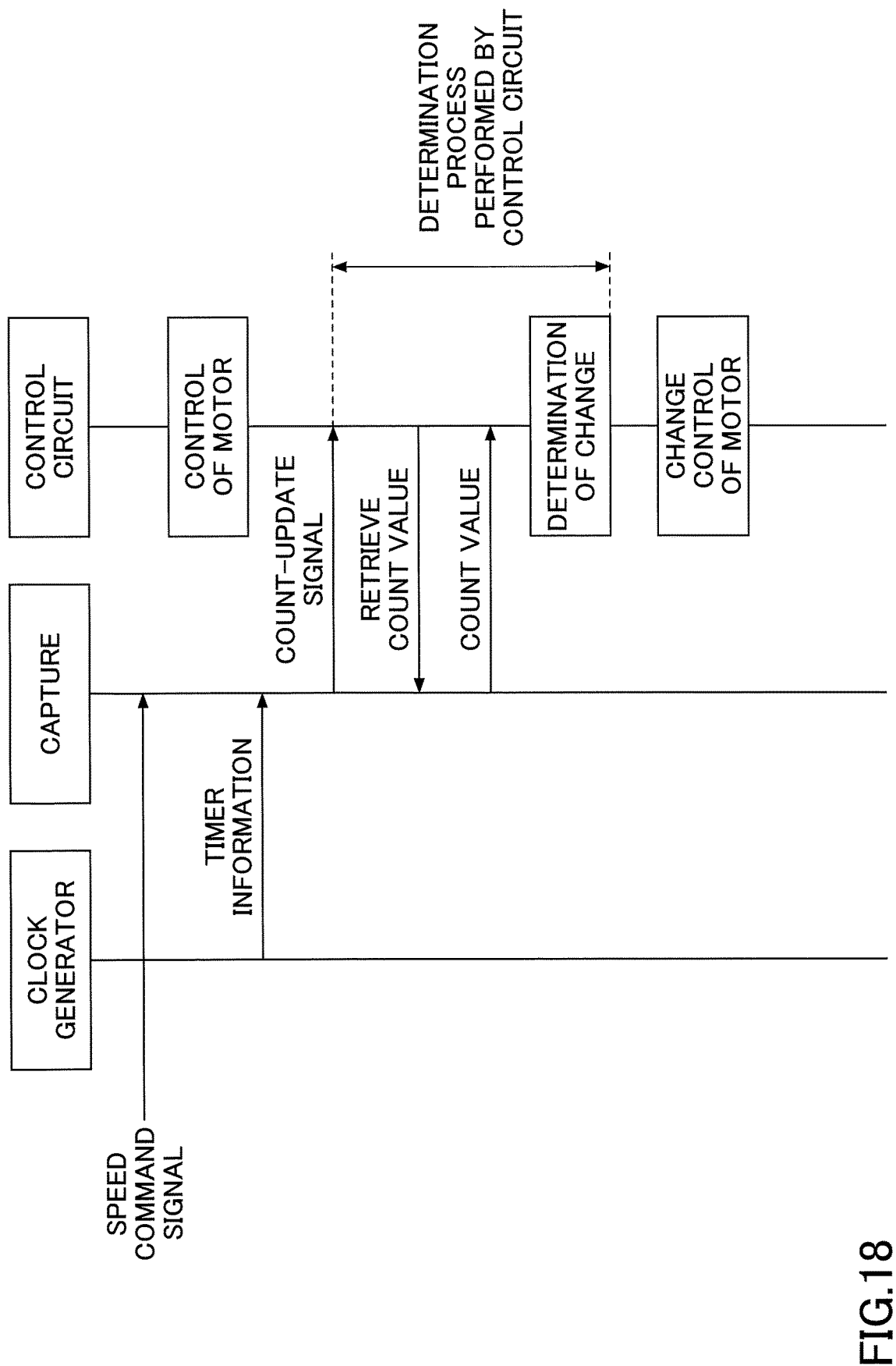
FIG. 18 is a sequence diagram for explaining an operation of the motor control circuit in the comparative example of the second embodiment.
Figure 19:
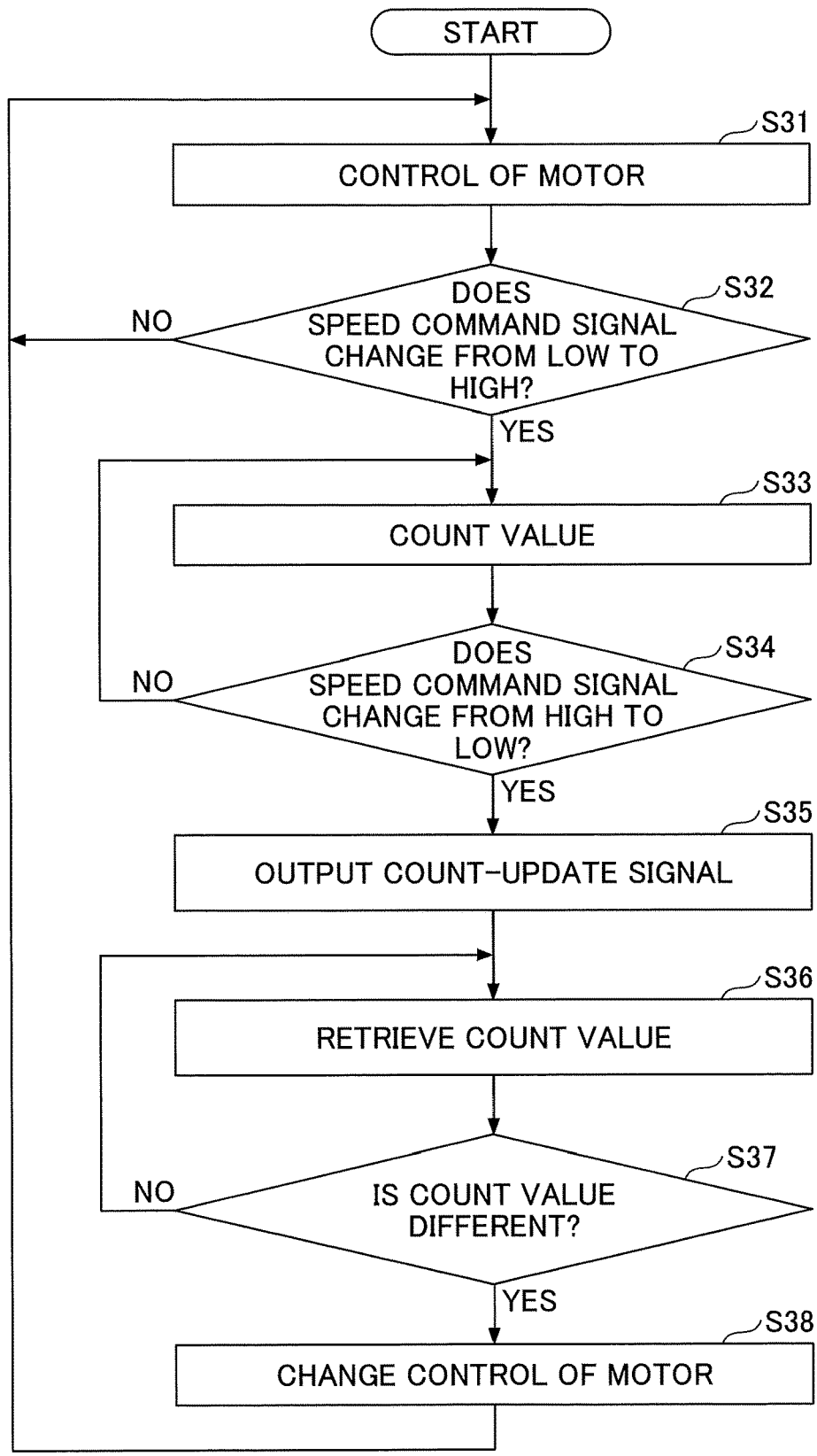
FIG. 19 is a flowchart for explaining an operation of the motor control circuit in the comparative example of the second embodiment.

Hereafter, an operation of the motor control circuit 400 will be described. FIG. 18 is a sequence diagram for explaining an operation of the motor control circuit in the comparative example of the second embodiment. FIG. 19 is a flowchart for explaining an operation of a motor control circuit in the comparative example of the second embodiment. The control circuit 31A controls a motor based on a speed command signal (step S31). When the speed command signal does not change from Low to High (No in step S32), the process in step S31 and step S32 is repeated. When the speed command signal changes from Low to High (Yes in step S32), the capture 25 counts a clock signal to obtain a count value (step S33).

Next, a process in step S33 and step S34 is repeated until the speed command signal changes from High to Low (No in step S34). When the speed command signal changes from High to Low (Yes in step S34), the count value is updated, and the capture 25 outputs a count-update signal indicating that a count value has been updated (step S35).

The control circuit 31A that has received the count-update signal retrieves a count value recorded by the capture 25 (step S36), and compares a pre-updating count value before the count value is updated with a post-updating count value immediately following the pre-updating count value (step S37). As a compared result, when the post-updating count value is same as the pre-updating count value (Yes in step S37), the process in step S36 and step S37 is repeated. When the post-updating count value is different from the pre-updating count value (Yes in step S37), the control circuit 31A changes control of the motor (step S38). As described above, the control circuit 31A records a pre-updating count value to compare the pre-updating count value with a post-updating count value, while controlling the motor.

Figure 20:
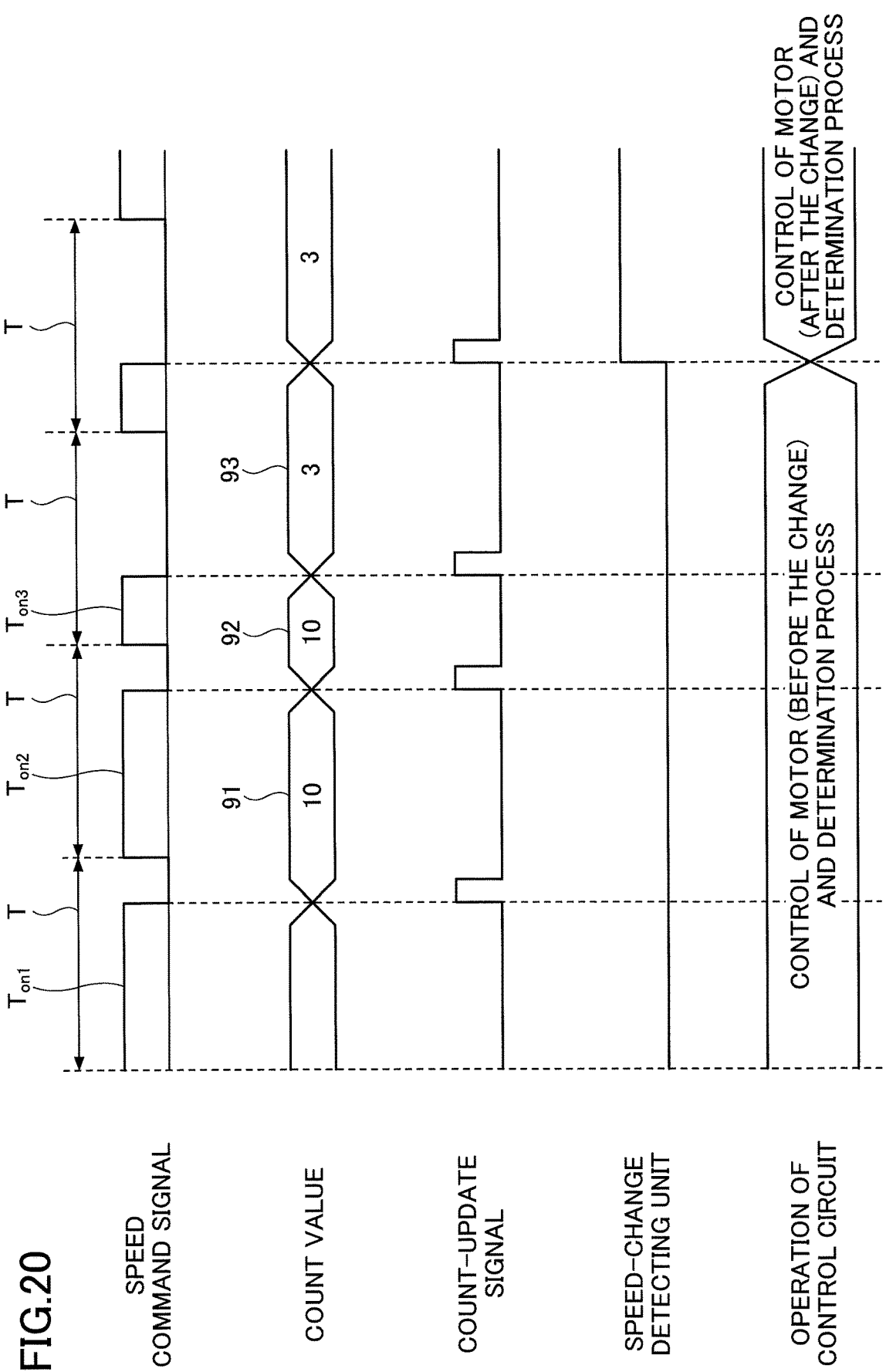
FIG. 20 is a time chart for explaining an operation of the motor control circuit in the comparative example of the second embodiment.

FIG. 20 is a time chart for explaining an operation of the motor control circuit in the comparative example of the second embodiment. FIG. 20 illustrates a speed command signal, count values, count-update signals, timing at which a change in speeds is detected, and an operating status of the control circuit. Each of respective periods indicated by Ton1, Ton2, and Ton3 is the time when a speed command signal indicates High, i.e., a speed command signal indicates an on-cycle. Ton1 and Ton2 are equal in length, and Ton3 is shorter than each of Ton1 and Ton2. A count value 91 corresponds to Ton1 and is "10", for example. A count value 92 corresponds to Ton2 and is "10", for example. A count value 93 corresponds to Ton3 and is "3", for example.

When the count value 91 is compared with the count value 92, a change in speeds is not detected because the count value 91 is same as the count value 92. When the count value 92 is compared with the count value 93, a change in speeds is detected because the count value 92 is different from the count value 93. When a change in speeds is detected, the control circuit 31A determines that a speed command signal has changed, and changes a duty cycle of a PWM signal such that a rotational speed of a motor 4 follows a value of the changed speed command signal. With respect to the motor control circuit 400 in the comparative example, the control circuit 31A performs determination of change in speeds in a speed command signal. Thereby, a processing load of an operational process performed by the control circuit 31A is increased compared to a case of the second embodiment in which the motor control circuit 31 is in operation of control of a motor only.

With respect to the motor control circuit 3-2 according to the second embodiment, the speed-change detecting circuit 20 performs determination of change in speeds in a speed command signal. In such a manner, the control circuit 31 can perform control of the motor only. Thereby, a processing load of an operational process performed by the control circuit 31A is decreased. Further, control of the motor can be changed immediately in response to a change in a speed command signal. As a result, responsiveness to control of a motor in accordance with a change in a speed command signal is improved. Also, even when a value indicative of a speed command signal changes frequently in a short period of time, a duty cycle of a PWM signal can be changed without delay. Accordingly, the motor controller 100-2 is capable of performing a complex control of motor operations. Further, a processing load of an operational process performed by the control circuit 31 is decreased, and thereby allowing for a more complex control of motor operations.

Figure 21:
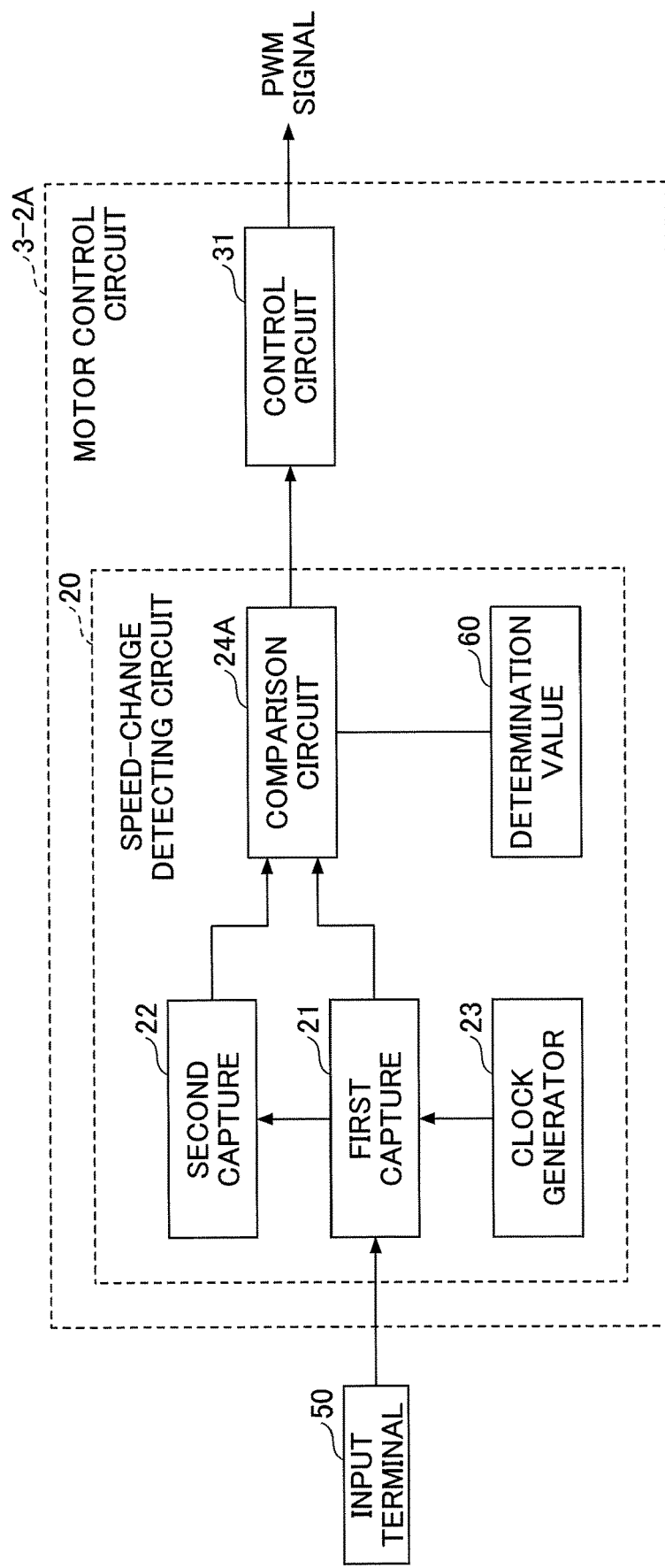
FIG. 21 is a diagram illustrating an example of a motor control circuit according to modification of the second embodiment.

FIG. 21 is a diagram illustrating an example of a motor control circuit according to modification of the second embodiment. As illustrated in FIG. 21, with respect to a motor control circuit 3-2A, a speed-change detecting circuit 20 includes a comparison circuit 24A, instead of the comparison circuit 24 in FIG. 12. The comparison circuit 24A calculates a difference between a pre-changing speed command signal before a speed command signal changes and a post-changing speed command signal immediately following the pre-changing speed command signal. The comparison circuit 24A further compares such a difference with a determination value (threshold) 60 that is set in the comparison circuit 24A. As a result of comparison between the difference and the determination value 60, when the difference is smaller than the determination value 60, the comparison circuit 24A does not output an interrupt signal.

When the difference is greater than or equal to the determination value 60, the comparison circuit 24A outputs an interrupt signal. Note that a determination process performed by the comparison circuit 24A is not limited to the example described above. The comparison circuit 24A may be configured not to output an interrupt signal when a difference is smaller than or equal to a determination value 60 and, further, may be configured to output an interrupt signal when a difference is greater than a determination value 60.

Figure 22:
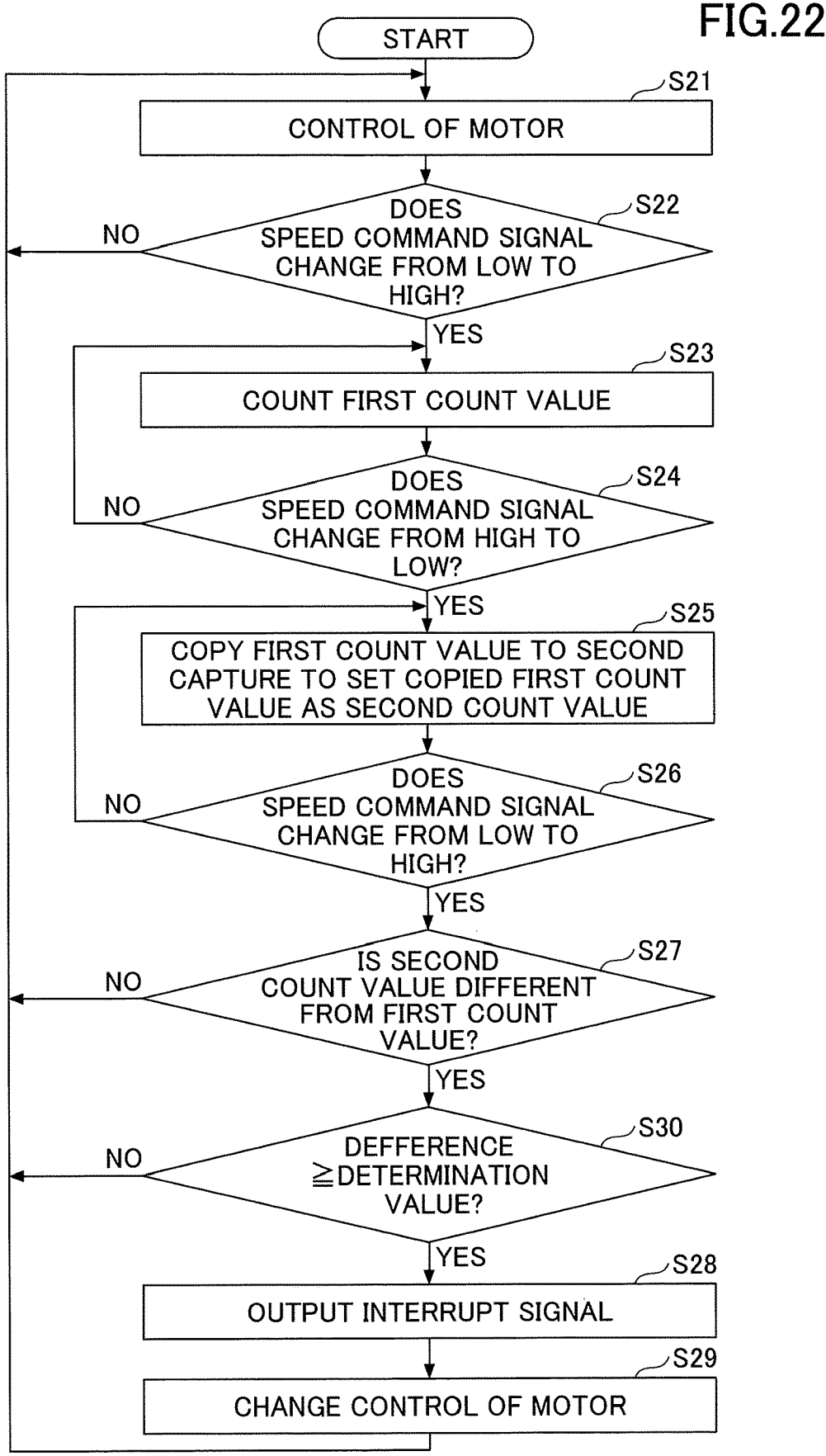
FIG. 22 is a flowchart for explaining an example of an operation of the motor control circuit illustrated in FIG. 21.

Hereafter, an operation of the motor control circuit 3-2A will be described. FIG. 22 is a flowchart for explaining an example of an operation of the motor control circuit illustrated in FIG. 21. A process from step S21 to step S27 illustrated in FIG. 22 are same as that from step S21 to step S27 illustrated in FIG. 15; accordingly, the explanation is omitted.

After a process in step S27, the comparison circuit 24A calculates a difference between a pre-changing speed command signal before a speed command signal changes and a post-changing speed command signal immediately following the pre-changing speed command signal. In other words, a difference between a first count value recorded by a first capture 21 and a second count value recorded by a second capture 22 is calculated. The comparison circuit 24A determines whether or not the calculated difference is greater than or equal to a determination value 60 (Yes in step S30). When the difference is smaller than the determination value 60 (No in step S30), the process from step S21 to step S30 is repeated. When the calculated difference is greater than or equal to the determination value 60 (Yes in step S30), the process in step S28 and step S29 is performed. The process in step S28 and step S29 is same as that in step S28 and step S29 illustrated in FIG. 15; accordingly, the explanation is omitted for such a process.

For example, when a first count value is "3" and a second count value is "10", a difference between those values indicates "7". In this case, as an example, when a determination value 60 is "2", the difference of "7" is greater than or equal to the determination value 60, and as a result, control of a motor is changed. On the other hand, when a first count value is "9" and a second count value is "10", a difference between those values is "1". In this case, as an example, when a determination value 60 is "2", the difference of "1" is smaller than the determination value 60, and as a result, control of a motor is not changed.

The motor control circuit 3-2A does not change control of a motor in response to a small change in a speed command signal, such as when a waveform of the speed command signal is distorted due to noise from a processor or the like that is provided around the motor control circuit 3-2A, by way of example. Thereby, the motor controller 100-2 allows for increased robustness. Further, the motor control circuit 3-2A can change control of a motor only when a speed command signal changes by a specific value. Thereby, a processing load in operating through the control circuit 31 is decreased, as well as reducing an amount of power consumption.

Note that, in the second embodiment, each of the motor control circuits 3-2 and 3-2A includes a motor-rotational speed determining circuit (control circuit 31) for determining a rotational speed of a motor. Each of the motor control circuits 3-2 and 3-2A is configured to change a form of pulse modulation used in driving of a motor in accordance with a rotational speed of the motor. Also, each of the motor control circuit 3-2 and 3-2A according to the second embodiment includes a speed-change detecting circuit 20, and is configured to detect a change in a speed command signal. Further, each of the motor control circuits 3-2 and 3-2A according to the second embodiment detects a change in a speed command signal by hardware component(s) only, and controls a motor accordingly.

Note that the configuration illustrated in each of the above embodiments is an example of the present disclosure. Such a configuration may be combined with other techniques known in the art, or be partially omitted or changed without departing from the spirit of the present disclosure.

What is claimed is:

1. A motor control circuit comprising:
a control circuit configured to output a pulse width modulation signal for controlling a switching operation of an inverter circuit, the inverter circuit being configured to supply an alternating current power to a motor; and
a speed-change detecting circuit configured to:
detect a change in a speed command signal, the change in the speed command signal being a difference between a pre-change speed command signal used before the speed command signal changes and a post-change speed command signal used immediately after the pre-change speed command signal, and
in response to the difference meeting or exceeding a predetermined limit, output a signal indicating that the speed command signal has changed to the control circuit to cause the control circuit to change a duty cycle of the pulse width modulation signal, the speed command signal specifying a target value of a rotational speed of the motor.

2. The motor control circuit according to claim 1, wherein the speed-change detecting circuit is configured to set a threshold as the limit, the threshold being used to be compared with the difference,
wherein the speed-change detecting circuit is configured not to output the signal upon detecting the difference being smaller than the threshold, based on a comparison between the difference and the threshold, and
wherein the control circuit is configured to maintain the duty cycle of the pulse width modulation signal to be same as a preceding duty cycle when the signal is not outputted.

3. The motor control circuit according to claim 1, wherein the speed-change detecting circuit is configured to set a threshold as the limit, the threshold being used to be compared with the difference,
wherein the speed-change detecting circuit is configured to output the signal upon detecting the difference being greater than or equal to the threshold, based on a comparison between the difference and the threshold, and
wherein the control circuit is configured to change the duty cycle of the pulse width modulation signal when the signal is outputted.

4. A motor controller comprising:
the motor control circuit according to claim 1;
an inverter circuit configured to be controlled by the motor control circuit, the inverter circuit including at least one switching element; and
a drive-signal generating circuit configured to generate a drive signal that causes the switching element to operate, based on a pulse width modulation signal from the motor control circuit.

5. A motor control circuit comprising:
a control circuit configured to output a pulse width modulation signal for controlling a switching operation of an inverter circuit, the inverter circuit being configured to supply an alternating current power to a motor; and
a speed-change detecting circuit configured to:
detect a change in a speed command signal, and
in response to the change meeting or exceeding a predetermined limit, output a signal indicating that the speed command signal has changed to the control circuit to cause the control circuit to change a duty cycle of the pulse width modulation signal, the speed command signal specifying a target value of a rotational speed of the motor
wherein the speed-change detecting circuit is configured to set a threshold as the limit, the threshold being used to be compared with a difference between a pre-change speed command signal used before the speed command signal changes and a post-change speed command signal used immediately after the pre-change speed command signal,
wherein the speed-change detecting circuit is configured not to output the signal upon detecting the difference being smaller than the threshold, based on a comparison between the difference and the threshold, and
wherein the control circuit is configured to maintain the duty cycle of the pulse width modulation signal to be same as a preceding duty cycle when the signal is not outputted.

6. A motor controller comprising:
the motor control circuit according to claim 5;
an inverter circuit configured to be controlled by the motor control circuit, the inverter circuit including at least one switching element; and
a drive-signal generating circuit configured to generate a drive signal that causes the switching element to operate, based on a pulse width modulation signal from the motor control circuit.

7. A motor control circuit comprising:
a control circuit configured to output a pulse width modulation signal for controlling a switching operation of an inverter circuit, the inverter circuit being configured to supply an alternating current power to a motor; and
a speed-change detecting circuit configured to:
detect a change in a speed command signal, and
in response to the change meeting or exceeding a predetermined limit, output a signal indicating that the speed command signal has changed to the control circuit to cause the control circuit to change a duty cycle of the pulse width modulation signal, the speed command signal specifying a target value of a rotational speed of the motor,
wherein the speed-change detecting circuit is configured to set a threshold as the limit, the threshold being used to be compared with a difference between a pre-change speed command signal used before the speed command signal changes and a post-change speed command signal used immediately after the pre-change speed command signal,
wherein the speed-change detecting circuit is configured to output the signal upon detecting the difference being greater than or equal to the threshold, based on a comparison between the difference and the threshold, and wherein the control circuit is configured to change the duty cycle of the pulse width modulation signal when the signal is outputted.

8. A motor controller comprising:
the motor control circuit according to claim 7;
an inverter circuit configured to be controlled by the motor control circuit, the inverter circuit including at least one switching element; and
a drive-signal generating circuit configured to generate a drive signal that causes the switching element to operate, based on a pulse width modulation signal from the motor control circuit.

\* \* \* \* \*